United States Patent
Ma et al.

(10) Patent No.: US 12,052,709 B2
(45) Date of Patent: Jul. 30, 2024

(54) METHOD FOR TRANSMITTING HYBRID AUTOMATIC REPEAT REQUEST HARQ FEEDBACK INFORMATION AND COMMUNICATIONS APPARATUS

(71) Applicant: HUAWEI TECHNOLOGIES CO., LTD., Guangdong (CN)

(72) Inventors: Ruixiang Ma, Shenzhen (CN); Lei Guan, Beijing (CN); Yuan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 408 days.

(21) Appl. No.: 17/516,474

(22) Filed: Nov. 1, 2021

(65) Prior Publication Data
US 2022/0061076 A1  Feb. 24, 2022

Related U.S. Application Data

(63) Continuation of application No. PCT/CN2020/087667, filed on Apr. 29, 2020.

(30) Foreign Application Priority Data

Apr. 30, 2019 (CN) .......................... 201910364217.3
Jul. 31, 2019 (CN) .......................... 201910702214.6

(51) Int. Cl.
*H04W 72/1273* (2023.01)
*H04L 1/00* (2006.01)
(Continued)

(52) U.S. Cl.
CPC ....... *H04W 72/1273* (2013.01); *H04L 1/0003* (2013.01); *H04L 1/1812* (2013.01); *H04W 72/0446* (2013.01)

(58) Field of Classification Search
None
See application file for complete search history.

(56) References Cited

U.S. PATENT DOCUMENTS

2015/0103705 A1*  4/2015  Yang ................... H04L 27/2626
                                                              370/280
2019/0053089 A1   2/2019  Kwak et al.
(Continued)

FOREIGN PATENT DOCUMENTS

CN    101835271 A    9/2010
CN    102136896 A    7/2011
(Continued)

OTHER PUBLICATIONS

ZTE, Enhancements for DL SPS configurations. 3GPP TSG RAN WG1 #96bis, Xi'an, China, Apr. 8-12, 2019, R1-1904150, 4 pages.
(Continued)

*Primary Examiner* — Diane L Lo
(74) *Attorney, Agent, or Firm* — HUAWEI TECHNOLOGIES CO., LTD.

(57) ABSTRACT

This application provides a method for transmitting hybrid automatic repeat request HARQ feedback information and a communications apparatus. A terminal device receives downlink data channels. Each of the downlink data channels has a corresponding transmission parameter group, and at least two downlink data channels correspond to different transmission parameter groups. The terminal device determines a first transmission resource based on first information including the transmission parameter groups, and sends, on the first transmission resource, HARQ feedback information corresponding to the downlink data channels, so that a plurality of pieces of HARQ feedback information can be smoothly fed back. This helps improve service transmission reliability.

15 Claims, 5 Drawing Sheets

(51) Int. Cl.
H04L 1/1812 (2023.01)
H04W 72/0446 (2023.01)

(56) References Cited

U.S. PATENT DOCUMENTS

| | | | | |
|---|---|---|---|---|
| 2020/0022144 | A1* | 1/2020 | Papasakellariou | H04W 72/23 |
| 2022/0053532 | A1* | 2/2022 | Baldemair | H04W 72/1273 |

FOREIGN PATENT DOCUMENTS

| | | | |
|---|---|---|---|
| CN | 102415193 | A | 4/2012 |
| CN | 103580823 | A | 2/2014 |
| CN | 103974430 | A | 8/2014 |
| CN | 104919744 | A | 9/2015 |
| CN | 106549734 | A | 3/2017 |
| CN | 107846731 | A | 3/2018 |
| CN | 108023696 | A | 5/2018 |
| CN | 108024349 | A | 5/2018 |
| CN | 108347307 | A | 7/2018 |
| CN | 109391440 | A | 2/2019 |
| CN | 109474371 | A | 3/2019 |
| WO | 2017160350 | A1 | 9/2017 |
| WO | 2019050363 | A1 | 3/2019 |
| WO | 2020093016 | A1 | 5/2020 |

OTHER PUBLICATIONS

Huawei, HiSilicon, Remaining issues on NR CA and DC including SRS switching. 3GPP TSG RAN WG1 Meeting #91, Reno, USA, Nov. 27-Dec. 1, 2017, R1-1719383, 18 pages.

Samsung (Rapporteur), List of open issues on NR MAC. 3GPP TSG-RAN WG2 Meeting #101bis, Sanya, China, Apr. 16 20, 2018, R2-1804571, 34 pages.

3GPP TS 38.213 V15.5.0 (Mar. 2019), 3rd Generation Partnership Project; Technical Specification Group Radio Access Network; NR; Physical layer procedures for control(Release 15), 104 pages.

Samsung, HARQ-ACK Feedback for Numerology Multiplexing. 3GPP TSG RAN WG1 #89, Hangzhou, China, May 15 19, 2017, R1-1708027, 4 pages.

3GPP TS 38.331 V15.5.1 (Apr. 2019), 3rd Generation Partnership Project; Technical Specification Group Radio Access Network; NR; Radio Resource Control (RRC) protocol specification(Release 15), 491 pages.

* cited by examiner

METHOD FOR TRANSMITTING HYBRID AUTOMATIC REPEAT REQUEST HARQ FEEDBACK INFORMATION AND COMMUNICATIONS APPARATUS

CROSS-REFERENCE TO RELATED APPLICATIONS

This application is a continuation of International Application No. PCT/CN2020/087667, filed on Apr. 29, 2020, which claims priority to Chinese Patent Application No. 201910702214.6, filed on Jul. 31, 2019 and Chinese Patent Application No. 201910364217.3, filed on Apr. 30, 2019. All of the aforementioned patent applications are hereby incorporated by reference in their entireties.

TECHNICAL FIELD

This application relates to the communications field, and more specifically, to a method for transmitting hybrid automatic repeat request (HARQ) feedback information and a communications apparatus.

BACKGROUND

Compared with previous generations of mobile communications systems, a fifth generation (5G) mobile communications system imposes higher requirements on a transmission rate, a latency, power consumption, and the like. The international telecommunication union (ITU) defines three types of application scenarios for 5G and a future mobile communications system: enhanced mobile broadband (eMBB), ultra-reliable and low-latency communications (URLLC), and massive machine-type communications (mMTC).

As one of three typical services of 5G, a URLLC service is mainly used in scenarios such as self driving and telemedicine. Higher requirements on reliability and the latency are imposed for these application scenarios. Specific requirements of the URLLC service include: 99.999% data transmission reliability, a transmission latency less than 1 ms, and overheads reduced as much as possible while requirements for high reliability and a low latency are met.

There is a technology referred to as semi-persistent scheduling (SPS) in 5G, and a main method is to configure a transmission parameter by using higher layer signaling, to indicate transmission of a periodic SPS physical downlink shared channel (PDSCH). Because only one physical downlink control channel (PDCCH) needs to be sent in the SPS, and then subsequent data transmission is performed periodically, signaling overheads are low. This is suitable for implementing transmission of a downlink URLLC periodic small packet. A means in the prior art cannot ensure that feedback information of a plurality of SPS PDSCHs is smoothly sent.

SUMMARY

In view of this, this application provides a method for transmitting HARQ feedback information and a communications apparatus, to ensure that HARQ feedback information of a plurality of downlink data channels is smoothly sent. This helps improve service transmission reliability.

According to a first aspect, a method for transmitting HARQ feedback information is provided, including: A terminal device (or a module in the terminal device, for example, a chip) obtains first information. The first information includes M transmission parameter groups, and M is an integer greater than or equal to 2. Then, the terminal device receives K downlink data channels. K is an integer greater than or equal to 2. Each of the K downlink data channels corresponds to one of the M transmission parameter groups. A first downlink data channel corresponds to a first transmission parameter group, and a second downlink data channel corresponds to a second transmission parameter group. The first downlink data channel and the second downlink data channel are different downlink data channels in the K downlink data channels. The first transmission parameter group and the second transmission parameter group are different transmission parameter groups in the M transmission parameter groups. The terminal device determines a first transmission resource based on the first information, and finally sends, on the first transmission resource, HARQ feedback information corresponding to the K downlink data channels. This can ensure that the HARQ feedback information of the K downlink data channels is smoothly sent, and help improve service transmission reliability.

Optionally, the HARQ feedback information corresponding to the K downlink data channels is located in one slot.

In a possible implementation, the K downlink data channels correspond to R transmission parameter groups. Each of the R transmission parameter groups includes one piece of resource indication information, and the resource indication information indicates one uplink control channel resource. $R \le K$, $R \le M$, and R is an integer greater than or equal to 2. Correspondingly, that the terminal device determines a first transmission resource based on the first information includes: The terminal device determines the first transmission resource based on resource indication information in the R transmission parameter groups.

Optionally, the first transmission resource is R uplink control channel resources indicated by the resource indication information in R transmission parameter groups, so that the R uplink control channel resources can be used to send the HARQ feedback information corresponding to the K downlink data channels, to ensure that the HARQ feedback information of each downlink data channel can be normally fed back. This helps improve service transmission reliability.

Optionally, that the terminal device sends, on the first transmission resource, HARQ feedback information corresponding to the K downlink data channels includes: If H uplink control channel resources in R uplink control channel resources indicated by the resource indication information in the R transmission parameter groups overlap in time domain, the terminal device sends, on a target uplink control channel resource, HARQ feedback information of downlink data channels corresponding to the H uplink control channel resources. $H \le R$, and H is an integer greater than or equal to 2. The target uplink control channel resource is a part or all of the first transmission resource. In other words, if the H uplink control channel resources in the R uplink control channel resources overlap in time domain, the target uplink control channel resource needs to be selected, to send, on the target uplink control channel resource, the HARQ feedback information of the downlink data channels corresponding to the H uplink control channel resources.

Certainly, if there is no overlap, HARQ feedback information of a downlink data channel corresponding to each of the R uplink control channel resources is sent on the uplink control channel resource.

Optionally, the target uplink control channel resource is an uplink control channel resource, at a foremost start location in time domain, in the H uplink control channel resources. Alternatively, the target uplink control channel resource is an uplink control channel resource, in the H uplink control channel resources, that meets a feedback latency required for sending the HARQ feedback information of the downlink data channels corresponding to the H uplink control channel resources and that is at the foremost start location in time domain. Alternatively, the target uplink control channel resource is an uplink control channel resource with a highest priority in the H uplink control channel resources.

Optionally, the method further includes: The terminal device receives second information, where the second information includes G pieces of resource indication information, each of the G pieces of resource indication information indicates one uplink control channel resource, and G is an integer greater than or equal to 2; and then determines, as the target uplink control channel resource based on a total quantity of bits of the HARQ feedback information of the downlink data channels corresponding to the H uplink control channel resources, one uplink control channel resource from G uplink control channel resources indicated by the G pieces of resource indication information. Optionally, the second information may be sent by a network device by using higher layer signaling. Therefore, the terminal device may select, from the G uplink control channel resources, one uplink control channel resource that meets the total quantity of bits of the HARQ feedback information of the downlink data channels corresponding to the H uplink control channel resources as the target uplink control channel resource.

Optionally, that the terminal device sends, on the first transmission resource, HARQ feedback information corresponding to the K downlink data channels includes: If H uplink control channel resources in R uplink control channel resources indicated by the resource indication information in the R transmission parameter groups overlap in time domain, the terminal device sends, on a first uplink control channel resource, HARQ feedback information of a downlink data channel corresponding to the first uplink control channel resource, and cancels sending of HARQ feedback information of a downlink data channel corresponding to a second uplink control channel resource. The first uplink control channel resource and the second uplink control channel resource are different uplink control channel resources in the H uplink control channel resources. The first uplink control channel resource is a part or all of the first transmission resource. Therefore, if the H uplink control channel resources overlap in time domain, HARQ feedback information of some downlink data channels may be discarded, to preferentially ensure smooth sending of HARQ feedback information of some other downlink data channels, to meet a service requirement.

Optionally, a priority of the first uplink control channel resource is higher than a priority of the second uplink control channel resource. Alternatively, a transmission period of the downlink data channel corresponding to the first uplink control channel resource is shorter than a transmission period of the downlink data channel corresponding to the second uplink control channel resource. Alternatively, an identifier of a transmission parameter group corresponding to the first uplink control channel resource is less than an identifier of a transmission parameter group corresponding to the second uplink control channel resource.

In another possible implementation, the first information further includes first resource indication information, and the first resource indication information is used to indicate the first transmission resource. Therefore, the terminal device may directly determine, based on an indication of the network device, one uplink control channel resource as the first transmission resource, to smoothly send the HARQ feedback information of the K downlink data channels. This helps improve service transmission reliability.

In still another possible implementation, the first information further includes N pieces of resource indication information. Each of the N pieces of resource indication information indicates one uplink control channel resource, and N is an integer greater than 1. Correspondingly, that the terminal device determines a first transmission resource based on the first information includes: The terminal device determines, as the first transmission resource based on a total quantity of bits of the feedback information corresponding to the K downlink data channels, one uplink control channel resource from N uplink control channel resources indicated by the N pieces of resource indication information. Therefore, the terminal device may select, from a plurality of uplink control channel resources indicated by the network device, one uplink control channel resource that matches the total quantity of bits of the HARQ feedback information as the first transmission resource, to smoothly send the HARQ feedback information of the K downlink data channels. This helps improve service transmission reliability.

Optionally, that the terminal device sends, on the first transmission resource, HARQ feedback information corresponding to the K downlink data channels includes: The terminal device sends, on the first transmission resource, only the HARQ feedback information of the K downlink data channels; or sends, on the first transmission resource, HARQ feedback information of all active downlink data channels, where all the active downlink data channels include the K downlink data channels; or sends, on the first transmission resource, HARQ feedback information of downlink data channels corresponding to the M transmission parameter groups, where the downlink data channels corresponding to the M transmission parameter groups include the K downlink data channels.

Therefore, in this embodiment of this application, a format of the HARQ feedback information sent on the first transmission resource may be defined, so that the network device and the terminal device have consistent understanding.

Optionally, the HARQ feedback information sent by the terminal device on the first transmission resource is arranged in the following sequence: first HARQ feedback information is before second HARQ feedback information. The first HARQ feedback information and the second HARQ feedback information meet the following condition: A priority of a downlink data channel corresponding to the first HARQ feedback information is higher than a priority of a downlink data channel corresponding to the second HARQ feedback information; or the priority of the downlink data channel corresponding to the first HARQ feedback information is the same as the priority of the downlink data channel corresponding to the second HARQ feedback information, and a start location, in time domain, of the downlink data channel corresponding to the first HARQ feedback information is earlier than a start location, in time domain, of the downlink data channel corresponding to the second HARQ feedback information. The first HARQ feedback information and the second HARQ feedback information are two different pieces of HARQ feedback information in the HARQ feedback information sent on the first transmission resource.

Optionally, each of the M transmission parameter groups includes one or more pieces of the following information: a transmission period of a downlink data channel, an identifier of the transmission parameter group, and a modulation and coding scheme MCS table used for downlink data channel transmission.

In a possible implementation, the K downlink data channels correspond to R transmission parameter groups. Each of the R transmission parameter groups includes one piece of resource indication information, and the resource indication information indicates S uplink control channel resource sets. R≤K, R≤M, and R is an integer greater than or equal to 2. S is a positive integer.

Correspondingly, that the terminal device determines a first transmission resource based on the first information includes: The terminal device determines R uplink control channel resource groups based on resource indication information in the R transmission parameter groups. One uplink control channel resource group includes S uplink control channel resource sets. The first transmission resource includes a first uplink control channel resource in a first uplink control channel resource set in each of the R uplink control channel resource groups. The first transmission resource includes R uplink control channel resources.

Optionally, when S is equal to 1, the first uplink control channel resource set is an uplink control channel resource set indicated by the resource indication information.

Alternatively, when S is greater than 1, one uplink control channel resource set is determined from the S uplink control channel resource sets as the first uplink control channel resource set based on a total quantity of bits of HARQ feedback information of downlink data channels corresponding to the S uplink control channel resource sets.

Alternatively, one uplink control channel resource may be indicated from the first uplink control channel resource set as the first uplink control channel resource based on an indication field in an active PDCCH of a downlink data channel corresponding to the first uplink control channel resource set.

Optionally, if H uplink control channel resources in the R uplink control channel resources overlap in time domain, HARQ feedback information of downlink data channels corresponding to the H uplink control channel resources is sent on a target uplink control channel resource. H≤R, and H is an integer greater than or equal to 2.

Optionally, the target uplink control channel resource may be determined in the following manner: One uplink control channel resource is indicated from a second uplink control channel resource set as the target uplink control channel resource based on an indication field in a last PDCCH in active PDCCHs of the downlink data channels corresponding to H uplink control channel resources, namely, an indication field in an active PDCCH at a rearmost time domain location.

Optionally, when a quantity S of uplink control channel resource sets in the first uplink control channel resource group is equal to 1, the second uplink control channel resource set is the uplink control channel resource set indicated by the resource indication information.

Alternatively, when the quantity S of uplink control channel resource sets in the first uplink control channel resource group is greater than 1, one uplink control channel resource set is determined from the S uplink control channel resource sets as the second uplink control channel resource set based on a total quantity of bits of the HARQ feedback information of the downlink data channels corresponding to the H uplink control channel resources.

According to a second aspect, a method for transmitting HARQ feedback information is provided, including: A network device (or a module in the network device, for example, a chip) sends first information. The first information includes M transmission parameter groups, and M is an integer greater than or equal to 2. The network device sends K downlink data channels based on the first information. K is an integer greater than or equal to 2. Each of the K downlink data channels corresponds to one of the M transmission parameter groups. A first downlink data channel corresponds to a first transmission parameter group, and a second downlink data channel corresponds to a second transmission parameter group. The first downlink data channel and the second downlink data channel are different downlink data channels in the K downlink data channels. The first transmission parameter group and the second transmission parameter group are different transmission parameter groups in the M transmission parameter groups. The network device receives, on a first transmission resource, HARQ feedback information corresponding to the K downlink data channels. This can ensure that the HARQ feedback information of the K downlink data channels is smoothly sent, and help improve service transmission reliability.

Optionally, the HARQ feedback information corresponding to the K downlink data channels is located in one slot.

In a possible implementation, the K downlink data channels correspond to R transmission parameter groups. Each of the R transmission parameter groups includes one piece of resource indication information, and the resource indication information indicates one uplink control channel resource. R≤K, R≤M, and R is an integer greater than or equal to 2.

Optionally, the first transmission resource is R uplink control channel resources indicated by resource indication information in the R transmission parameter groups, so that a terminal device can use the R uplink control channel resources to send the HARQ feedback information corresponding to the K downlink data channels, to ensure that the HARQ feedback information of each downlink data channel can be normally fed back. This helps improve service transmission reliability.

Optionally, that the network device receives, on a first transmission resource, HARQ feedback information of the K downlink data channels includes: If H uplink control channel resources in R uplink control channel resources indicated by resource indication information in the R transmission parameter groups overlap in time domain, the network device receives, on a target uplink control channel resource, HARQ feedback information of downlink data channels corresponding to the H uplink control channel resources. H≤R, and H is an integer greater than or equal to 2. The target uplink control channel resource is a part or all of the first transmission resource. In other words, if the H uplink control channel resources in the R uplink control channel resources overlap in time domain, the HARQ feedback information of the downlink data channels corresponding to the H uplink control channel resources needs to be received on the target uplink control channel resource. This helps improve service transmission reliability.

Certainly, if there is no overlap, HARQ feedback information of a downlink data channel corresponding to each of the R uplink control channel resources is received on the uplink control channel resource.

Optionally, the target uplink control channel resource is an uplink control channel resource, at a foremost start location in time domain, in the H uplink control channel resources. Alternatively, the target uplink control channel resource is an uplink control channel resource that is in the H uplink control channel resources and that meets a latency requirement required for sending the feedback information.

Alternatively, the target uplink control channel resource is an uplink control channel resource with a highest priority in the H uplink control channel resources.

Optionally, the method further includes: The network device sends second information, where the second information includes G pieces of resource indication information, each of the G pieces of resource indication information indicates one uplink control channel resource, and G is an integer greater than or equal to 2; and determines, as the target uplink control channel resource based on a total quantity of bits of the HARQ feedback information of the downlink data channels corresponding to the H uplink control channel resources, one uplink control channel resource from G uplink control channel resources indicated by the G pieces of resource indication information. Therefore, the network device sends the second information to a terminal device, so that the terminal device may select, from the G uplink control channel resources, one uplink control channel resource that meets the total quantity of bits of the HARQ feedback information of the downlink data channels corresponding to the H uplink control channel resources as the target uplink control channel resource.

Optionally, that the network device receives, on a first transmission resource, HARQ feedback information of the K downlink data channels includes: If H uplink control channel resources in R uplink control channel resources indicated by resource indication information in the R transmission parameter groups overlap in time domain, the network device receives, on a first uplink control channel resource, HARQ feedback information of a downlink data channel corresponding to the first uplink control channel resource; and skips receiving, on a second uplink control channel resource, HARQ feedback information of a downlink data channel corresponding to the second uplink control channel resource. The first uplink control channel resource and the second uplink control channel resource are different uplink control channel resources in the H uplink control channel resources. The first uplink control channel resource is a part or all of the first transmission resource. Therefore, if the H uplink control channel resources overlap in time domain, HARQ feedback information of some downlink data channels may be discarded, to preferentially ensure smooth sending of HARQ feedback information of some other downlink data channels, to meet a service requirement.

Optionally, a priority of the first uplink control channel resource is higher than a priority of the second uplink control channel resource. Alternatively, a transmission period of the downlink data channel corresponding to the first uplink control channel resource is shorter than a transmission period of the downlink data channel corresponding to the second uplink control channel resource. Alternatively, an identifier of a transmission parameter group corresponding to the first uplink control channel resource is less than an identifier of a transmission parameter group corresponding to the second uplink control channel resource.

In another possible implementation, the first information further includes first resource indication information. The first resource indication information is used to indicate a first uplink control channel resource, and the first uplink control channel resource is the first transmission resource. Therefore, the network device may indicate, to the terminal device, one uplink control channel resource as the first transmission resource, to smoothly send the HARQ feedback information of the K downlink data channels. This helps improve service transmission reliability.

In still another possible implementation, the first information further includes N pieces of resource indication information. Each of the N pieces of resource indication information indicates one uplink control channel resource, and N is an integer greater than 1. The method further includes: The network device determines, as the first transmission resource based on a total quantity of bits of the HARQ feedback information corresponding to the K downlink data channels, one uplink control channel resource from N uplink control channel resources indicated by the N pieces of resource indication information. Therefore, the network device may indicate a plurality of uplink control channel resources to the terminal device, so that the terminal device may select, from the plurality of uplink control channel resources, one uplink control channel resource that matches the total quantity of bits of the HARQ feedback information as the first transmission resource, to smoothly send the HARQ feedback information of the K downlink data channels. This helps improve service transmission reliability.

Optionally, that the network device receives, on a first transmission resource, HARQ feedback information corresponding to the K downlink data channels includes: The network device receives, on the first transmission resource, the HARQ feedback information of the K downlink data channels; or receives, on the first transmission resource, HARQ feedback information of all active downlink data channels, where all the active downlink data channels include the K downlink data channels; or receives, on the first transmission resource, HARQ feedback information of downlink data channels corresponding to the M transmission parameter groups, where the downlink data channels corresponding to the M transmission parameter groups include the K downlink data channels.

Therefore, in this embodiment of this application, a format of the HARQ feedback information sent on the first transmission resource may be defined, so that the network device and the terminal device have consistent understanding.

Optionally, the HARQ feedback information received by the network device on the first transmission resource is arranged in the following sequence: first HARQ feedback information is before second HARQ feedback information. The first HARQ feedback information and the second HARQ feedback information meet the following condition: A priority of a downlink data channel corresponding to the first HARQ feedback information is higher than a priority of a downlink data channel corresponding to the second HARQ feedback information; or the priority of the downlink data channel corresponding to the first HARQ feedback information is the same as the priority of the downlink data channel corresponding to the second HARQ feedback information, and a start location, in time domain, of the downlink data channel corresponding to the first HARQ feedback information is earlier than a start location, in time domain, of the downlink data channel corresponding to the second HARQ feedback information. The first HARQ feedback information and the second HARQ feedback information are two different pieces of HARQ feedback information in the HARQ feedback information sent on the first transmission resource.

Optionally, each of the M transmission parameter groups includes one or more pieces of the following information: a transmission period of a downlink data channel, an identifier of the transmission parameter group, and a modulation and coding scheme MCS table used for downlink data channel transmission.

In a possible implementation, the K downlink data channels correspond to R transmission parameter groups. Each of the R transmission parameter groups includes one piece of resource indication information, and the resource indication information indicates S uplink control channel resource sets. R≤K, R≤M, and R is an integer greater than or equal to 2. S is a positive integer.

Correspondingly, the first transmission resource includes a first uplink control channel resource in a first uplink control channel resource set in each of the R uplink control channel resource groups. The first transmission resource includes R uplink control channel resources.

Optionally, when S is equal to 1, the first uplink control channel resource set is an uplink control channel resource set indicated by the resource indication information. Alternatively, when S is greater than 1, one uplink control channel resource set is determined from the S uplink control channel resource sets as the first uplink control channel resource set based on a total quantity of bits of HARQ feedback information of downlink data channels corresponding to the S uplink control channel resource sets. Alternatively, one uplink control channel resource may be indicated from the first uplink control channel resource set as the first uplink control channel resource based on an indication field in an active PDCCH of a downlink data channel corresponding to the first uplink control channel resource set.

Optionally, if H uplink control channel resources in the R uplink control channel resources overlap in time domain, HARQ feedback information of downlink data channels corresponding to the H uplink control channel resources is received on a target uplink control channel resource. H≤R, and H is an integer greater than or equal to 2.

Optionally, the target uplink control channel resource may be determined in the following manner: One uplink control channel resource is indicated from a second uplink control channel resource set as the target uplink control channel resource based on an indication field in a last PDCCH in active PDCCHs of the downlink data channels corresponding to H uplink control channel resources, namely, an indication field in an active PDCCH at a rearmost time domain location.

Optionally, when a quantity S of uplink control channel resource sets in the first uplink control channel resource group is equal to 1, the second uplink control channel resource set is the uplink control channel resource set indicated by the resource indication information.

Alternatively, when the quantity S of uplink control channel resource sets in the first uplink control channel resource group is greater than 1, one uplink control channel resource set is determined from the S uplink control channel resource sets as the second uplink control channel resource set based on a total quantity of bits of the HARQ feedback information of the downlink data channels corresponding to the H uplink control channel resources.

According to a third aspect, a communications apparatus is provided. The communications apparatus includes a module configured to perform the method in any one of the first aspect or the possible implementations of the first aspect, or a module configured to perform the method in any one of the second aspect or the possible implementations of the second aspect.

According to a fourth aspect, a communications apparatus is provided. The communications apparatus may be the terminal device in the foregoing methods, or a chip disposed in the terminal device. The communications apparatus includes a processor that is coupled to a memory, and the processor may be configured to execute an instruction in the memory, to implement the method performed by the terminal device in any one of the first aspect and the possible implementations of the first aspect. Optionally, the communications apparatus further includes the memory. Optionally, the communications apparatus further includes a communications interface, and the processor is coupled to the communications interface.

When the communications apparatus is the terminal device, the communications interface may be a transceiver or an input/output interface.

When the communications apparatus is the chip disposed in the terminal device, the communications interface may be an input/output interface.

Optionally, the transceiver may be a transceiver circuit. Optionally, the input/output interface may be an input/output circuit.

According to a fifth aspect, a communications apparatus is provided. The communications apparatus may be the network device in the foregoing methods, or a chip disposed in the network device. The communications apparatus includes a processor that is coupled to a memory, and the processor may be configured to execute an instruction in the memory, to implement the method performed by the network device in any one of the second aspect and the possible implementations of the second aspect. Optionally, the communications apparatus further includes the memory. Optionally, the communications apparatus further includes a communications interface, and the processor is coupled to the communications interface.

When the communications apparatus is the network device, the communications interface may be a transceiver or an input/output interface.

When the communications apparatus is the chip disposed in the network device, the communications interface may be an input/output interface.

Optionally, the transceiver may be a transceiver circuit. Optionally, the input/output interface may be an input/output circuit.

According to a sixth aspect, a program is provided. When being executed by a processor, the program is used to perform any method in the first aspect and the possible implementations of the first aspect, or to perform any method in the second aspect and the possible implementations of the second aspect.

According to a seventh aspect, a program product is provided. The program product includes program code. When the program code is run by a communications apparatus, the communications apparatus is enabled to perform any method in the first aspect and the possible implementations of the first aspect.

According to an eighth aspect, a program product is provided. The program product includes program code. When the program code is run by a communications apparatus, the communications apparatus is enabled to perform any method in the second aspect and the possible implementations of the second aspect.

According to a ninth aspect, a computer-readable storage medium is provided. The computer-readable storage medium stores a program. When the program is executed, a communications apparatus is enabled to perform any method in the first aspect and the possible implementations of the first aspect.

According to a tenth aspect, a computer-readable storage medium is provided. The computer-readable storage medium stores a program. When the program is executed, a communications apparatus is enabled to perform any method in the second aspect and the possible implementations of the second aspect.

DESCRIPTION OF EMBODIMENTS

The following describes technical solutions of this application with reference to accompanying drawings.

In the embodiments of this application, "a plurality of" may be understood as "at least two"; and "a plurality of items" may be understood as "at least two items".

The technical solutions in the embodiments of this application may be applied to various communications systems, for example, a long term evolution (LTE) system, a new radio (NR) system in a 5th generation (5G) mobile communications system, and a future mobile communications system.

Figure 1:
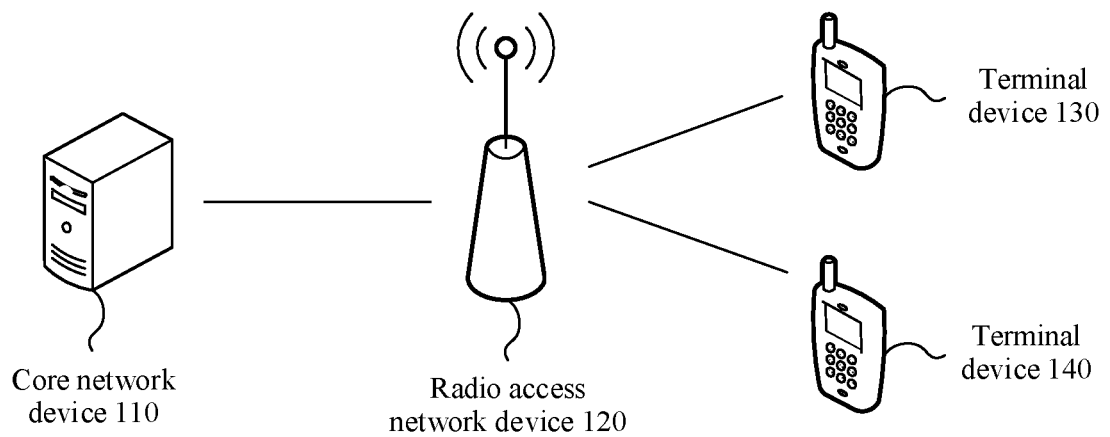
FIG. 1 is a schematic diagram of an architecture of a mobile communications system to which an embodiment of this application is applicable.

FIG. 1 is a schematic diagram of an architecture of a mobile communications system to which an embodiment of this application is applicable. As shown in FIG. 1, the mobile communications system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be different physical devices that are independent of each other, or functions of the core network device and logical functions of the radio access network device may be integrated into a same physical device, or some functions of the core network device and some functions of the radio access network device may be integrated into one physical device. The terminal device may be at a fixed position, or may be mobile. FIG. 1 is merely a schematic diagram. The communications system may further include another network device, for example, may further include a wireless relay device and a wireless backhaul device, which are not shown in FIG. 1. Quantities of core network devices, radio access network devices, and terminal devices included in the mobile communications system are not limited in this embodiment of this application.

The radio access network (RAN) device is an access device used by the terminal device to access the mobile communications system in a wireless manner, and may be a base station (NodeB), an evolved NodeB (eNB), a next generation NodeB (gNB) in a 5G mobile communications system, a transmission point, a base station in a future mobile communications system, an access node in a wireless fidelity (Wi-Fi) system, or one antenna panel or a group of antenna panels (including a plurality of antenna panels) of a base station in a 5G system. Alternatively, the network device may be a network node, such as a baseband unit (BBU) or a distributed unit (DU), that constitutes a gNB or a transmission point. A specific technology and a specific device form used by the radio access network device are not limited in this embodiment of this application. In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that a network device may be a device including one or more of a CU node, a DU node, and an AAU node. In addition, the CU may be used as a network device in an access network, or may be used as a network device in a core network (CN). This is not limited in this application.

The terminal device may also be referred to as a terminal, user equipment (UE), a mobile station (MS), a mobile terminal (MT), or the like. The terminal device may be a mobile phone, a tablet (Pad), a computer with a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. A specific technology and a specific device form used by the terminal device are not limited in this embodiment of this application.

The radio access network device and the terminal may be deployed on land, including being deployed indoor or outdoor, or being handheld or vehicle-mounted; may be deployed on water; or may be deployed on an airplane, a balloon, and a satellite in the air. Application scenarios of the radio access network device and the terminal device are not limited in this embodiment of this application.

This embodiment of this application may be applicable to downlink signal transmission, or uplink signal transmission, or device-to-device (D2D) signal transmission. For the downlink signal transmission, a sending device is a radio access network device, and a corresponding receiving device is a terminal device. For the uplink signal transmission, a sending device is a terminal device, and a corresponding receiving device is a radio access network device. For the D2D signal transmission, a sending device is a terminal device, and a corresponding receiving device is also a terminal device. A signal transmission direction is not limited in this embodiment of this application.

Communication between the radio access network device and the terminal device and communication between the terminal devices may be performed by using a licensed spectrum, or an unlicensed spectrum, or both a licensed spectrum and an unlicensed spectrum. Communication between the radio access network device and the terminal device and communication between the terminal devices may be performed by using a spectrum below 6 gigahertz (GHz), or a spectrum above 6G, or both a spectrum below 6G and a spectrum above 6G. Spectrum resources used for the radio access network device and the terminal device are not limited in this embodiment of this application.

In the embodiments of this application, unless otherwise specified, the network device is a radio access network device. The terminal device or the network device may include a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not limited in the embodiments of this application provided that a program that records code for the method provided in the embodiments of this application can be run to perform communication according to the method provided in the embodiments of this application. For example, the execution body of the method provided in the embodiments of this application may be the terminal device, the network device, or a functional module that is in the terminal device or the network device and that can invoke and execute the program.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

It should be understood that in some of the embodiments of this application, a downlink control channel may be a physical downlink control channel (PDCCH), or an enhanced physical downlink control channel (EPDCCH), but for ease of description, the following uses only the PDCCH as an example for description; an uplink control channel may be a physical uplink control channel (PUCCH), but for ease of description, the following uses only the PUCCH as an example for description; and a downlink data channel may be a physical downlink shared channel (PDSCH), but for ease of description, the following uses only the PDSCH as an example for description. The downlink control channel, the uplink control channel, and the downlink data channel may have different names in different systems. Specific names of these channels are not limited in the embodiments of this application.

Before the embodiments of this application are described, related SPS content is described for ease of understanding.

In SPS, one transmission parameter group is configured by using higher layer signaling to indicate transmission of one periodic SPS PDSCH. Parameters in the transmission parameter group include: (1) one scheduling period P, where a minimum period currently is 10 ms; (2) a PUCCH resource, mainly used to indicate which resource, for example, which symbol in a slot is configured as a PUCCH resource that carries an ACK/NACK of the SPS PDSCH, where currently, a candidate value can only be a PUCCH format 0 or a PUCCH format 1, and the two PUCCH formats can accommodate 1-bit or 2-bit feedback information; and (3) a modulation and coding scheme (MCS) table, mainly used to indicate which one of three MCS tables is used for the SPS PDSCH. A protocol specifies three MCS tables, and this indication information is used to notify a user which one of the three tables is used. Each MCS table has a plurality of rows, and each row indicates one MCS.

An SPS PDSCH communication process includes:

(1) A network device sends configuration information to a terminal device by using higher layer signaling, to configure the period P and the PUCCH resource of the SPS PDSCH.

(2) The network device sends an active PDCCH to the terminal device, where the active PDCCH indicates a slot in which the SPS PDSCH is located, and a start symbol S and a length L of the SPS PDSCH in the slot. In addition, the active PDCCH further indicates a slot in which HARQ feedback information corresponding to the SPS PDSCH is located.

A manner in which the active PDCCH indicates the slot in which the SPS PDSCH is located and the start symbol S and the length L of the SPS PDSCH in the slot is as follows: Downlink control information (DCI) carried in the PDCCH indicates a row in a time domain resource table. The time domain resource table may be a table predefined by the protocol or a table configured by using higher layer signaling. The table includes a plurality of rows, and each row includes a K0 parameter, used to indicate a quantity of slots between a slot in which the PDCCH is located and the slot in which the SPS PDSCH is located, and a parameter indicating values of S and L. The values of S and L may be indicated by using a start and length indicator value (SLIV) parameter. A value of the SLIV parameter is obtained by jointly encoding the values of S and L. Alternatively, the values of S and L are indicated by using two independent parameters. The foregoing two manners of indicating the values of S and L may be uniformly indicated by using (S, L).

For example, a time domain resource table is shown in the following Table 1. In Table 1, one index value corresponds to one value combination of K0 and (S, L).

TABLE 1

| Index | K0 | (S, L) |
|---|---|---|
| 0 | 1 | (2, 4) |
| 1 | 1 | (1, 2) |
| 2 | 2 | (3, 4) |
| 3 | 2 | (0, 7) |

For example, the DCI includes a 2-bit indication field, and it is assumed that the indication field indicates an index 1. It can be learned from Table 1 that K0 corresponding to the index 1 is 1, a start symbol S is a symbol 1, and a length L is two symbols. In other words, if the active PDCCH of the SPS PDSCH is received in an $n^{th}$ slot, correspondingly, the SPS PDSCH is in an $(n+1)^{th}$ slot, and is in a symbol 1 and a symbol 2 in the $(n+1)^{th}$ slot.

A method in which the active PDCCH indicates the slot in which the HARQ feedback information corresponding to the SPS PDSCH is located is as follows: Indication information is carried in the DCI, where the indication information indicates a K1 value in a K1 set. The K1 set may be a set configured by using the higher layer signaling, and a value of K1 indicates a quantity of slots between the slot in which the SPS PDSCH is located and the slot in which the corresponding HARQ feedback information is located. It is assumed that a SPS PDSCH is in the $(n+1)^{th}$ slot. In this case, HARQ feedback information corresponding to the SPS PDSCH is in an $(n+1+K1)^{th}$ slot. For example, it is assumed that a SPS PDSCH is in the $n^{th}$ slot, and K1 is equal to 4. In this case, HARQ feedback information corresponding to the SPS PDSCH is fed back in an $(n+4)^{th}$ slot.

For an SPS configuration, the terminal device may determine, based on the SPS scheduling period P configured by a higher layer signaling and a time domain location that is of the SPS PDSCH and that is indicated by the active PDCCH, time domain locations of subsequent SPS PDSCHs, and does not need to send an active PDCCH before each SPS PDSCH. The active PDCCH corresponding to each of the subsequent SPS PDSCHs is the PDCCH that initially activates the SPS PDSCH. A K1 value of the slot in which the HARQ feedback information corresponding to the SPS PDSCH is located and that is indicated by the active PDCCH is also applicable to the subsequent SPS PDSCH. It is assumed that any subsequent SPS PDSCH is in the $n^{th}$ slot, and K1 is equal to 4. In this case, HARQ feedback information corresponding to the SPS PDSCH is fed back in the $(n+4)^{th}$ slot.

The active PDCCH may further indicate a modulation and coding scheme (MCS) used by the SPS PDSCH. A row in the foregoing MCS table indicated by the higher layer signaling may be indicated, and content of the row includes the MCS and the like.

For ease of understanding, the following uniformly describes terms or concepts that may be used in the embodiments of this application.

A time unit may be a frame, a subframe, a slot, a mini-slot, a symbol, or another time domain unit. The mini-slot is a time domain unit whose time domain length is less than a time domain length of the slot. A time length of one frame is 10 milliseconds (ms), including 10 subframes. A time length corresponding to each subframe is 1 ms. One slot includes 12 symbols in a case of an extended cyclic prefix, and includes 14 symbols in a case of a normal cyclic prefix. The "time domain symbol" herein may be an orthogonal frequency division multiplexing (OFDM) symbol. A quantity of time domain symbols included in one mini-slot is less than 14. For example, the quantity is 2, 4, or 7. Alternatively, one slot may include seven time domain symbols, and a quantity of time domain symbols included in one mini-slot is less than 7. For example, the quantity may be 2 or 4. A specific value is not limited either.

A URLLC service has a plurality of application scenarios, for example, factory automation or a smart grid. Service periods in different scenarios are different, and reliability and latency requirements are also different. Therefore, it is difficult to meet requirements of a plurality of services if only one period is configured for an SPS configuration. Therefore, a plurality of SPS configurations may be configured to meet different service requirements. However, if the plurality of SPS configurations are activated, feedback information of a plurality of SPS PDSCHs needs to be fed back in a same uplink slot. However, a configured PUCCH resource can accommodate limited bit information, and the feedback information of the plurality of SPS PDSCHs cannot be put in. Consequently, uplink information may not be fed back, affecting service reliability.

Figure 2:
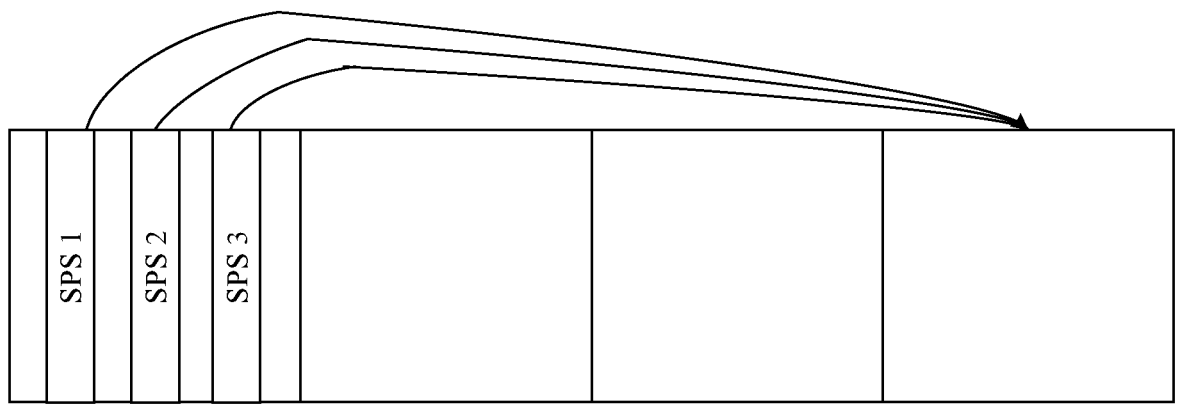
FIG. 2 is a schematic diagram of sending feedback information in the prior art.

FIG. 2 is a schematic diagram of sending feedback information in the prior art. As shown in FIG. 2, three SPS configurations (an SPS configuration 1, an SPS configuration 2, and an SPS configuration 3) are configured for a terminal device. Feedback information of PDSCHs of the three SPS configurations includes at least 3 bits. If the prior art is used, the feedback information of the PDSCHs of the three SPS configurations needs to be fed back in a same uplink slot. However, a configured PUCCH can accommodate only 1-bit or 2-bit information, and cannot carry feedback information of PDSCHs of a plurality of SPS configurations. Consequently, the feedback information cannot be fed back. In this case, a network device cannot receive feedback information of downlink data in time, and cannot perform scheduling for retransmission in time based on the feedback information. This affects a latency and reliability of the PDSCHs.

In the embodiments of this application, the terminal device determines one or more transmission resources, to ensure that HARQ feedback information of a plurality of PDSCHs can be sent. If one transmission resource is used, a quantity of bits that can be carried by the transmission resource may meet a total quantity of bits of the HARQ feedback information of the plurality of PDSCHs.

The following describes a method for transmitting HARQ feedback information, a terminal device, and a network device according to the embodiments of this application with reference to FIG. 3 to FIG. 7.

Figure 3:
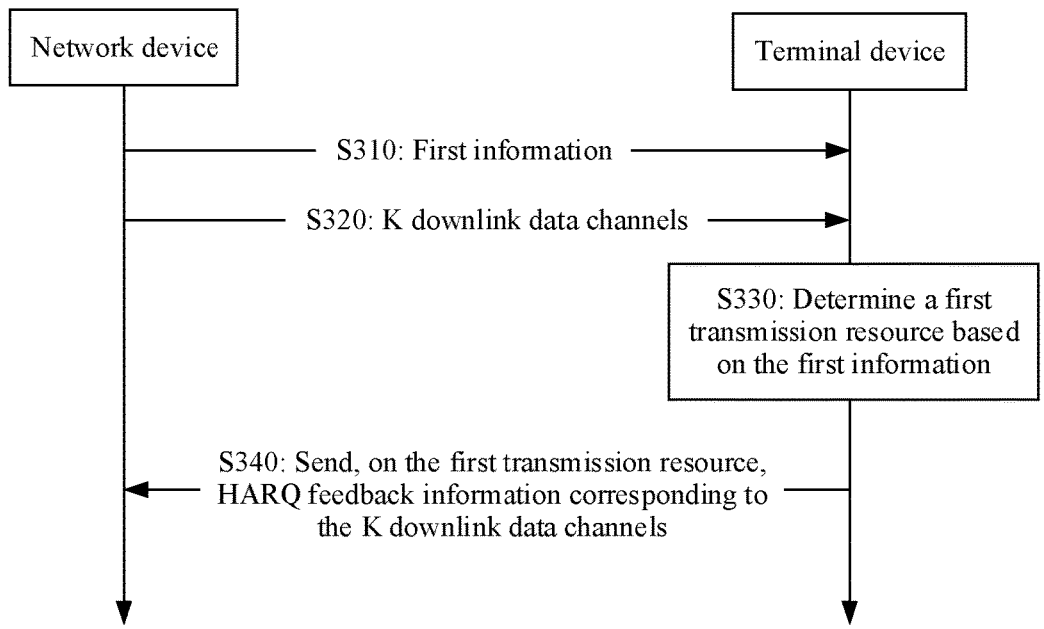
FIG. 3 is a schematic interaction diagram of a method for transmitting HARQ feedback information according to an embodiment of this application.

FIG. 3 is a schematic flowchart of a method 300 for transmitting HARQ feedback information according to an embodiment of this application. As shown in FIG. 3, the method 300 includes the following steps.

S310: A network device sends first information to a terminal device, where the first information includes M transmission parameter groups, and M is an integer greater than or equal to 2. Correspondingly, the terminal device receives the first information.

Optionally, the network device may send the first information by using higher layer signaling. In other words, the first information is carried in the higher layer signaling. The higher layer signaling may be signaling sent by a higher-layer protocol layer. The higher-layer protocol layer is at least one protocol layer above a physical layer. The higher-layer protocol layer may include at least one of the following protocol layers: a medium access control (MAC) layer, a radio link control (RLC) layer, a packet data convergence protocol (PDCP) layer, a radio resource control (RRC) layer, and a non-access stratum (NAS).

If the terminal device receives the M transmission parameter groups, the terminal device may locally store the M transmission parameter groups. Optionally, the terminal device may locally obtain the M transmission parameter groups. This is not limited in this embodiment of this application.

Each of the M transmission parameter groups includes one or more pieces of the following information: a transmission period of a downlink data channel, an identifier of the transmission parameter group, and a modulation and coding scheme MCS table used for PDSCH transmission.

The M transmission parameter groups in this application are M SPS configurations. Each SPS configuration includes one or more of the transmission period of the downlink data channel, the identifier of the transmission parameter group, and the modulation and coding scheme MCS table used for PDSCH transmission.

A transmission period of a PDSCH may be a scheduling period configured by a higher layer, for example, may be 10 milliseconds (ms). The terminal device may determine, based on the transmission period of the PDSCH, a time unit in which a subsequent PDSCH is located, and the network device does not need to send a PDCCH each time before sending a PDSCH. Herein, a first sent PDSCH may be referred to as a PDSCH having scheduling information. Subsequent PDSCHs of the first sent PDSCH are sent based on a transmission period of the PDSCH, and these subsequent PDSCHs may be referred to as PDSCHs without scheduling information.

The identifier of the transmission parameter group may be a group number, and one group number corresponds to one transmission parameter group. For example, if there are three transmission parameter groups, identifiers of the transmission parameter groups may be respectively 1, 2, and 3, or 0, 1, and 2. In this way, in each of a plurality of active PDCCHs, the network device may indicate, by using an identifier of a transmission parameter group corresponding to the PDSCH, which transmission parameter group is activated by a PDCCH corresponding to the PDSCH. For example, DCI carried in the PDCCH may include a bit field. The bit field includes Q bits. A value of Q depends on a quantity of configured transmission parameter groups or a maximum quantity of transmission parameter groups. $Q=\log_2^W$, where W is the quantity of configured transmission parameter groups or the maximum quantity of transmission parameter groups. For example, it is assumed that the maximum quantity of transmission parameter groups is 4, and identifiers of the groups are respectively 0, 1, 2, and 3. In this case, Q=2 bits are included in the PDCCH, and a value of the 2 bits is used to indicate an identifier of a corresponding transmission parameter group. For example, the 2 bits are "00" that indicates a first transmission parameter group and "11" that indicates a fourth transmission parameter group.

Currently, three MCS tables are defined in a standard. Each MCS table has a plurality of rows, and each row includes information such as a modulation and coding scheme and a bit rate that are used for the PDSCH. The MCS table used for PDSCH transmission is to indicate which of the three MCS tables is used for the PDSCH. The terminal device may learn, from the MCS table, the modulation and coding scheme used for the PDSCH, to receive the PDSCH.

Optionally, the M transmission parameter groups may include transmission periods of M PDSCHs, identifiers of the M transmission parameter groups, and MCS tables used for transmission of the M PDSCHs. In other words, an $i^{th}$ transmission period in the transmission periods of the M PDSCHs, an $i^{th}$ identifier in the identifiers of the M transmission parameter groups, and an $i^{th}$ MCS table in the MCS tables used for transmission of the M PDSCHs jointly form a transmission parameter group, namely, an $i^{th}$ transmission parameter group in the M transmission parameter groups. Alternatively, the M transmission parameter groups include M parameter groups. Each parameter group includes a transmission period of one PDSCH, an identifier of one transmission parameter group, and one MCS table used for PDSCH transmission.

Alternatively, the M transmission parameter groups may include only M first parameters, and the first information further includes one second parameter and one third parameter. The second parameter and the third parameter are shared by the M transmission parameter groups. For example, the M transmission parameter groups may include the identifiers of the M transmission parameter groups. To be specific, the first parameter is the identifier of the transmission parameter group. The first information further includes one MCS table used for PDSCH transmission and a transmission period of one PDSCH. In other words, the MCS table used for PDSCH transmission and the transmission period are shared by the M transmission parameter groups. The second parameter is the MCS table used for PDSCH transmission, and the third parameter is the transmission period of the PDSCH.

Alternatively, the M transmission parameter groups may include only M first parameters and M second parameters, and the first information further includes one third parameter. The third parameter is shared by the M transmission parameter groups. For example, the M transmission parameter groups include the identifiers of the M transmission parameter groups and the transmission periods of the M PDSCHs, and the first information further includes one MCS table used for PDSCH transmission. In other words, MCS tables used for PDSCH transmission are the same. To be specific, the first parameter is the identifier of the transmission parameter group, the second parameter is the transmission period of the PDSCH, and the third parameter is the MCS table used for PDSCH transmission.

It may be understood that the first parameter may be any one of the transmission period of the PDSCH, the identifier of the transmission parameter group, and the MCS table used for PDSCH transmission. Correspondingly, parameters other than the first parameter may be selected as the second parameter and the third parameter. It should be understood that, actually, there may be a plurality of combinations of the M transmission parameter groups. The foregoing examples are merely examples for description, and constitute no limitation on the protection scope of the embodiments of this application.

S320: The network device sends K PDSCHs to the terminal device, where K is an integer greater than or equal to 2, each of the K PDSCHs corresponds to one of the M transmission parameter groups, a first PDSCH corresponds to a first transmission parameter group, a second PDSCH corresponds to a second transmission parameter group, the first PDSCH and the second PDSCH are different PDSCHs in the K PDSCHs, and the first transmission parameter group and the second transmission parameter group are different transmission parameter groups in the M transmission parameter groups. The K PDSCHs may be PDSCHs without scheduling information. Correspondingly, the terminal device receives the K PDSCHs.

The K PDSCHs are PDSCHs that need to send feedback information in a same time unit. For example, it is assumed that a PDSCH 1 is received in a time unit n, and it is determined, based on indication information in an active PDCCH corresponding to the PDSCH 1, that the PDSCH 1 needs to send feedback information in a time unit n+4. In addition, a PDSCH 2 is received in a time unit n+2, and it is determined, based on indication information in an active PDCCH corresponding to the PDSCH 2, that the PDSCH 2 also needs to send feedback information in the time unit n+4. In this case, the two PDSCHs are two data channels in the K PDSCHs. All PDSCHs that send feedback information in a same time unit are the K PDSCHs described in this embodiment of this application.

K is an integer greater than or equal to 2. In other words, this embodiment of this application is specific to a case in which at least two PDSCHs send feedback information in a same time unit.

The foregoing describes a case in which the K PDSCHs are the PDSCHs that need to send feedback information in the same time unit. In this embodiment of this application, the K PDSCHs may alternatively be determined in another manner, and the K PDSCHs determined in the another manner are also applicable to this embodiment of this application. This is not limited. The following describes a manner of determining the K PDSCHs in detail.

The K PDSCHs are PDSCHs carrying data of a same service type. Optionally, a specific service type of the data carried by the PDSCH may be determined based on a DCI format carried on an active PDCCH corresponding to the PDSCH, a transmission period of the PDSCH, an identifier of a transmission parameter group corresponding to the PDSCH, or priority indication information in the transmission parameter group corresponding to the PDSCH. Alternatively, the specific service type of the data carried by the PDSCH may be determined based on a radio network temporary identifier (RNTI) that scrambles a cyclic redundancy check (CRC) parity bits of a PDCCH, where the PDCCH is the active PDCCH corresponding to the PDSCH. Alternatively, the specific service type of the data carried by the PDSCH may be determined based on a search space or a control resource set (CORESET) in which the active PDCCH corresponding to the PDSCH is located.

For example, a plurality of PDSCHs with a same DCI format carried in active PDCCHs corresponding to the PDSCHs are PDSCHs carrying data of a same service type. For example, if the active PDCCH corresponding to the PDSCH 1 carries a DCI format 1, the active PDCCH corresponding to the PDSCH 2 carries a DCI format 1, and an active PDCCH corresponding to a PDSCH 3 carries a DCI format 2, it is determined that the PDSCH 1 and the PDSCH 2 are PDSCHs carrying data of a same service type, the PDSCH 3 is a PDSCH carrying data of another type. Herein, the data carried by the K PDSCHs belongs to the same service type. It may be considered that DCI formats carried in active PDCCHs corresponding to the K PDSCHs are the same.

For example, data carried by a PDSCH whose transmission period is less than or equal to a first period threshold is of a service type, and data carried by a PDSCH whose transmission period is greater than the first period threshold is of another service type. Alternatively, data carried by a PDSCH whose transmission period is less than the first period threshold is of a service type, and data carried by a PDSCH whose transmission period is greater than or equal to the first period threshold is of another service type. The first period threshold may be predetermined in a protocol or indicated by the higher layer signaling. Optionally, the first period threshold is one slot. For example, it is assumed that the first period threshold is one slot (for example, the slot includes 14 symbols), a transmission period corresponding to the PDSCH 1 is two symbols, a transmission period corresponding to the PDSCH 2 is seven symbols, and a transmission period corresponding to the PDSCH 3 is two slots. It can be learned that both the two symbols and the seven symbols are less than one slot, so that it may be determined that the PDSCH 1 and the PDSCH 2 are PDSCHs carrying data of a same service type, and the PDSCH 3 is a PDSCH carrying data of another type. Herein, the data carried by the K PDSCHs belongs to the same service type. It may be considered that transmission periods corresponding to the K PDSCHs are all less than or equal to the first period threshold, or are all greater than the first period threshold.

For example, data carried by a PDSCH whose corresponding transmission parameter group has an identifier less than or equal to a first identifier threshold is of a service type, and data carried by a PDSCH whose corresponding transmission parameter group has an identifier greater than the first identifier threshold is of another service type. Alternatively, data carried by a PDSCH whose corresponding transmission parameter group has an identifier less than the first identifier threshold is of a service type, and data carried by a PDSCH whose corresponding transmission parameter group has an identifier greater than or equal to the first identifier threshold is of another service type. The first identifier threshold may be predetermined in the protocol or indicated by the higher layer signaling. For example, it is assumed that the first identifier threshold is 2, an identifier of a transmission parameter group corresponding to the PDSCH 1 is 1, an identifier of a transmission parameter group corresponding to the PDSCH 2 is 2, and an identifier of a transmission parameter group corresponding to the PDSCH 3 is 3. It can be learned that the identifier of the transmission parameter group corresponding to the PDSCH 1 and the identifier of the transmission parameter group corresponding to the PDSCH 2 are less than or equal to 2, so that it is determined that the PDSCH 1 and the PDSCH 2 are PDSCHs carrying data of a same service type, and the PDSCH 3 is a PDSCH carrying data of another type. Herein, the data carried by the K PDSCHs belongs to the same service type. It may be considered that identifiers of transmission parameter groups corresponding to the K PDSCHs are all less than or equal to the first identifier threshold, or are all greater than the first identifier threshold.

For example, each of the M transmission parameter groups includes one piece of priority indication information, and the priority indication information indicates a service type of data carried by a PDSCH corresponding to the transmission parameter group. Data carried by PDSCHs whose corresponding transmission parameter groups have same priority indication information are of a same service type. For example, it is assumed that priority indication information in the transmission parameter group corresponding to the PDSCH 1 is 1, priority indication information in the transmission parameter group corresponding to the PDSCH 2 is 1, and priority indication information in the transmission parameter group corresponding to the PDSCH 3 is 3. It can be learned that both the priority indication information in the transmission parameter group corresponding to the PDSCH 1 and the priority indication information in the transmission parameter group corresponding to the PDSCH 2 are 1, so that it is determined that the PDSCH 1 and the PDSCH 2 are PDSCHs carrying data of a same service type, and the PDSCH 3 is a PDSCH carrying data of another type. Herein, the data carried by the K PDSCHs belongs to the same service type. It may be considered that service types indicated by priority indication information in the transmission parameter groups corresponding to the K PDSCHs are the same.

For example, data carried by PDSCHs scheduled by PDCCHs with a same RNTI that scrambles CRC parity bits of the PDCCHs is of a same service type, where the PDCCHs are active PDCCHs corresponding to the PDSCHs. For example, a PDCCH 1 is an active PDCCH corresponding to the PDSCH 1, and an RNTI that scrambles a CRC parity bit of the PDCCH 1 is an RNTI 1. A PDCCH 2 is an active PDCCH corresponding to the PDSCH 2, and an RNTI that scrambles a CRC parity bit of the PDCCH 2 is the RNTI 1. A PDCCH 3 is an active PDCCH corresponding to the PDSCH 3, and an RNTI that scrambles a CRC parity bit of the PDCCH 3 is an RNTI 2. In this case, it is determined that the PDSCH 1 and the PDSCH 2 are PDSCHs carrying data of a same service type, and the PDSCH 3 is a PDSCH carrying data of another type. Herein, the data carried by the K PDSCHs belongs to the same service type. It may be considered that K RNTIs that scramble CRC parity bits of PDCCHs are the same, where the PDCCHs are the active PDCCHs corresponding to the PDSCHs.

For example, PDSCHs whose corresponding active PDCCHs are in a same search space or CORESET are PDSCHs carrying data of a same service type. For example, a search space in which the active PDCCH corresponding to the PDSCH 1 is located is a search space 1, a search space in which the active PDCCH corresponding to the PDSCH 2 is located is the search space 1, and a search space in which the active PDCCH corresponding to the PDSCH 3 is located is a search space 2. In this case, it is determined that the PDSCH 1 and the PDSCH 2 are PDSCHs carrying data of a same service type, and the PDSCH 3 is a PDSCH carrying data of another type. For example, a control resource set in which the active PDCCH corresponding to the PDSCH 1 is located is a CORESET 1, a control resource set in which the active PDCCH corresponding to the PDSCH 2 is located is the CORESET 1, and a control resource set in which the active PDCCH corresponding to the PDSCH 3 is located is a CORESET 2. In this case, it is determined that the PDSCH 1 and the PDSCH 2 are PDSCHs carrying data of a same service type, and the PDSCH 3 is a PDSCH carrying data of another type. Herein, the data carried by the K PDSCHs belongs to the same service type. It may be considered that the active PDCCHs corresponding to the K PDSCHs are located in a same search space or CORESET.

K is an integer greater than or equal to 2. In other words, this embodiment of this application is specific to a case in which data carried by at least two PDSCHs belongs to a same service type.

In this embodiment of this application, each of the K PDSCHs may correspond to one transmission parameter group. In addition, at least two PDSCHs correspond to different transmission parameter groups.

Each PDSCH corresponds to one active PDCCH. The active PDCCH indicates an identifier of one of the M transmission parameter groups. In other words, the active PDCCH correspondingly indicates one transmission parameter group. For example, for a PDSCH 1 in the K PDSCHs, the PDSCH 1 is determined based on an active PDCCH 1. The active PDCCH 1 indicates that an identifier of a transmission parameter group is 1, and the PDCCH 1 schedules a PDSCH for transmission. Then, a time unit in which a subsequent PDSCH is located is determined based on a transmission period of the PDSCH in the transmission parameter group whose identifier is 1. Each of all subsequent PDSCHs corresponds to the transmission parameter group whose identifier is 1.

The terminal device receives a first active PDCCH, and the first active PDCCH indicates an identifier of the first transmission parameter group in the M transmission parameter groups, to indicate that the first transmission parameter group is activated. The terminal device schedules one PDSCH for transmission by using the first PDCCH, and then may determine, based on a transmission period of the PDSCH in the first transmission parameter group, a time unit in which a subsequent PDSCH is located. These PDSCHs determined based on the first transmission parameter group are all PDSCHs corresponding to the first transmission parameter group, namely, first PDSCHs.

Similarly, the terminal device receives a second active PDCCH. The second PDCCH activates the second transmission parameter group, and the second PDCCH is used to schedule another PDSCH for transmission. The terminal device may determine, based on a transmission period of the PDSCH in the second transmission parameter group, a time unit in which a subsequent PDSCH is located. These PDSCHs determined based on the second transmission parameter group are all PDSCHs corresponding to the second transmission parameter group, namely, second PDSCHs.

In addition, the first transmission parameter group is different from the second transmission parameter group. In other words, the K PDSCHs correspond to at least two transmission parameter groups. It is assumed that the K PDSCHs correspond to only two transmission parameter groups. To be specific, in the K PDSCHs, K1 PDSCHs correspond to the first transmission parameter group, and K2 PDSCHs correspond to the second transmission parameter group, where K1+K2=K, and K1 and K2 are positive integers.

S330: The terminal device determines a first transmission resource based on the first information.

S340: The terminal device sends, on the first transmission resource, HARQ feedback information corresponding to the K PDSCHs. Correspondingly, the network device receives, on the first transmission resource, the HARQ feedback information corresponding to the K PDSCHs from the terminal device.

Optionally, the HARQ feedback information corresponding to the K PDSCHs is located in a same slot.

Optionally, the HARQ feedback information corresponding to the K PDSCHs is located in a same subslot. The subslot may be a ½ slot, or a ⅐ slot, or B symbols, where B is a positive integer less than 14.

Optionally, one HARQ codebook is generated by using the HARQ feedback information corresponding to the K PDSCHs. In this case, optionally, the K PDSCHs are PDSCHs carrying data of a same service type.

Herein, the first transmission resource may be one or more PUCCH resources. The terminal device may send, on one PUCCH resource, the HARQ feedback information corresponding to the K PDSCHs, and a quantity of bits that can be carried on the PUCCH resource is greater than or equal to a total quantity of bits of the HARQ feedback information corresponding to the K PDSCHs. Alternatively, the terminal device may send, on a plurality of PUCCH resources, the HARQ feedback information corresponding to the K PDSCHs. HARQ feedback information corresponding to one PDSCH may be sent on each PUCCH resource, or HARQ feedback information corresponding to more than two PDSCHs may be sent on one PUCCH resource (a premise is that a quantity of bits that can be carried on the PUCCH resource can meet a bit requirement of the HARQ feedback information corresponding to the more than two PDSCHs). Certainly, in any case, it can be ensured that the HARQ feedback information corresponding to the K PDSCHs can be smoothly sent. This helps improve service transmission reliability.

The following describes different implementations of S330 and S340 in this embodiment of this application.

First Possible Implementation

Each of the M transmission parameter groups includes one piece of resource indication information, and the resource indication information indicates one PUCCH resource. In this way, the terminal device may send the HARQ feedback information of the K PDSCHs by using a plurality of PUCCH resources.

For example, the K PDSCHs correspond to R transmission parameter groups. Each of the R transmission parameter groups includes one piece of resource indication information, and the resource indication information indicates one PUCCH resource. R≤K, R≤M, and R is an integer greater than or equal to 2. Correspondingly, that the first transmission resource is determined based on the first information includes: The first transmission resource is determined based on resource indication information in the R transmission parameter groups.

Optionally, the first transmission resource is R PUCCH resources indicated by the resource indication information in the R transmission parameter groups.

The R transmission parameter groups are transmission parameter groups in the M transmission parameter groups. Because the K PDSCHs correspond to the R transmission parameter groups, the K PDSCHs correspond to the R PUCCH resources indicated by the resource indication information in the R transmission parameter groups. If the K PDSCHs correspond to the R transmission parameter groups, the terminal device may determine the R PUCCH resources by using the resource indication information in the R transmission parameter groups, to send the HARQ feedback information corresponding to the K PDSCHs by using the R PUCCH resources, so as to ensure that the HARQ feedback information of each PDSCH can be normally fed back. This helps improve service transmission reliability.

For example, it is assumed that M is equal to 4. In other words, the first information includes four transmission parameter groups. The terminal device receives K=8 PDSCHs, and the eight PDSCHs are PDSCHs that need to send HARQ feedback information in a same time unit. For example, if five of the eight PDSCHs correspond to the first transmission parameter group, and remaining three PDSCHs correspond to the second transmission parameter group, the eight PDSCHs correspond to a total of R=2 transmission parameter groups. Resource indication information corresponding to the first transmission parameter group indicates a first PUCCH resource, and resource indication information corresponding to the second transmission parameter group indicates a second PUCCH resource. In this case, the first PUCCH resource corresponds to the five PDSCHs, in other words, HARQ feedback information corresponding to the five PDSCHs is sent on the first PUCCH resource; and the second PUCCH resource corresponds to the three PDSCHs, in other words, HARQ feedback information corresponding to the three PDSCHs is sent on the second PUCCH resource.

Optionally, in an implementation, S340 includes: The terminal device sends, on each of the R PUCCH resources, HARQ feedback information of a PDSCH corresponding to the PUCCH resource.

For example, it is assumed that M is equal to 8. In other words, the first information includes eight transmission parameter groups. The terminal device receives K=10 PDSCHs, and the 10 PDSCHs are PDSCHs that need to send feedback information in a same time unit. For example, if six of the 10 PDSCHs correspond to the first transmission parameter group, and remaining four PDSCHs correspond to the second transmission parameter group, the 10 PDSCHs correspond to a total of R=2 transmission parameter groups. If the resource indication information corresponding to the first transmission parameter group indicates the first PUCCH resource, and the resource indication information corresponding to the second transmission parameter group indicates the second PUCCH resource, HARQ feedback information corresponding to the six PDSCHs is sent on the first PUCCH resource, and HARQ feedback information corresponding to the four PDSCHs is sent on the second PUCCH resource.

Optionally, in another implementation, before sending the HARQ feedback information corresponding to the K PDSCHs by using the R PUCCH resources, the terminal device may first determine whether the R PUCCH resources overlap. If there is no overlap, the HARQ feedback information of the PDSCH corresponding to each of the R PUCCH resources is sent on the PUCCH resource. If there is an overlap, for PUCCH resources that overlap, a PUCCH resource needs to be selected to send HARQ feedback information of PDSCHs corresponding to the PUCCH resources that overlap.

That the PUCCH resources overlap may be that any two of the R PUCCH resources overlap. It should be understood that any two PUCCH resources overlap means that, in the any two PUCCH resources, there is a same time unit between a time unit occupied by one PUCCH resource and a time unit occupied by the other PUCCH resource.

For example, it is assumed that M is equal to 4. In other words, the first information includes four transmission parameter groups. The terminal device receives K=8 PDSCHs, and the eight PDSCHs are PDSCHs that need to send HARQ feedback information in a same time unit. For example, if five of the eight PDSCHs correspond to the first transmission parameter group, and remaining three PDSCHs correspond to the second transmission parameter group, the eight PDSCHs correspond to a total of R=2 transmission parameter groups. The resource indication information corresponding to the first transmission parameter group indicates the first PUCCH resource, and the resource indication information corresponding to the second transmission parameter group indicates the second PUCCH resource. The terminal device may determine whether the first PUCCH resource and the second PUCCH resource overlap. It is assumed that a time unit occupied by the first PUCCH resource is a symbol 2 to a symbol 5 in a slot n, and a time unit occupied by the second PUCCH resource is a symbol 7 to a symbol 8 in the slot n. Time domain symbols corresponding to the two PUCCH resources are different. It indicates that there is no overlap. In this case, HARQ feedback information corresponding to the five PDSCHs is sent on the first PUCCH resource, and HARQ feedback information corresponding to the three PDSCHs is sent on the second PUCCH resource. It is assumed that the time unit occupied by the first PUCCH resource is the symbol 2 to the symbol 5 in the slot n, and the time unit occupied by the second PUCCH resource is a symbol 4 to a symbol 6 in the slot n. The two PUCCH resources have same time units, namely, the symbol 4 and the symbol 5. It indicates that the first PUCCH resource and the second PUCCH resource overlap. In this case, the HARQ feedback information corresponding to the five PDSCHs cannot be sent on the first PUCCH resource, and the HARQ feedback information corresponding to the three PDSCHs cannot be sent on the second PUCCH resource. Instead, a PUCCH resource needs to be selected to send HARQ feedback information of PDSCHs corresponding to the overlapping PUCCH resources.

For example, if H PUCCH resources in the R PUCCH resources overlap in time domain, HARQ feedback information of PDSCHs corresponding to the H PUCCH resources is sent on a target PUCCH resource. H≤R, and H is an integer greater than or equal to 2. The target uplink control channel resource is a part or all of the first transmission resource.

That H PUCCH resources in the R PUCCH resources overlap in time domain means that there are H PUCCH resources in the R PUCCH resources, and any one of the H PUCCH resources can find at least one PUCCH resource that overlaps the PUCCH resource from the H PUCCH resources. If the H PUCCH resources meet the following condition, the H PUCCH resources overlap in time domain: A third PUCCH resource overlaps a fourth PUCCH resource in the H PUCCH resources. The third PUCCH resource is a PUCCH resource other than a fifth PUCCH resource. A time domain location of an end symbol of the fourth PUCCH resource is after a time domain location of an end symbol of the third PUCCH resource. An end symbol of the fifth PUCCH resource is at the end of end symbols of the H PUCCH resources. In other words, a PUCCH resource other than a last PUCCH resource in the H PUCCH resources is referred to as the third PUCCH resource herein. A PUCCH resource whose end symbol is after the end symbol of the third PUCCH resource may always be found in the H PUCCH resources, and is referred to as the fourth PUCCH resource herein, so that the third PUCCH resource overlaps the fourth PUCCH resource in time domain.

Figure 4:
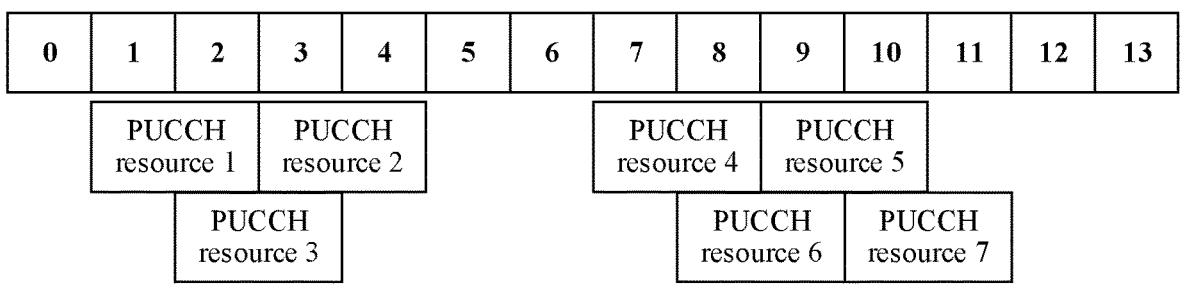
FIG. 4 is an example diagram of a PUCCH resource according to an embodiment of this application.

For ease of understanding, description is provided herein with reference to an example in FIG. 4. As shown in FIG. 4, it is assumed that R is equal to 7. To be specific, there are seven PUCCH resources: a PUCCH resource 1 (occupying a symbol 1 and a symbol 2), a PUCCH resource 2 (occupying a symbol 3 and a symbol 4), a PUCCH resource 3 (occupying the symbol 2 and the symbol 3), a PUCCH resource 4 (occupying a symbol 7 and a symbol 8), a PUCCH resource 5 (occupying a symbol 9 and a symbol 10), a PUCCH resource 6 (occupying the symbol 8 and the symbol 9), and a PUCCH resource 7 (occupying the symbol 10 and a symbol 11). In the seven PUCCH resources, the PUCCH resource 1, the PUCCH resource 2, and the PUCCH resource 3 are three overlapping PUCCH resources in the seven PUCCH resources. Any one of the three PUCCH resources can find at least one PUCCH resource that overlaps the PUCCH resource from the three PUCCH resources, and the three PUCCH resources do not overlap remaining four PUCCH resources in the seven PUCCH resources. For example, the PUCCH resource 1 overlaps the PUCCH resource 3, the PUCCH resource 2 overlaps the PUCCH resource 3, and the PUCCH resource 3 overlaps both the PUCCH resource 2 and the PUCCH resource 1. The PUCCH resource 4 (occupying the symbol 7 and the symbol 8), the PUCCH resource 5 (occupying the symbol 9 and the symbol 10), the PUCCH resource 6 (occupying the symbol 8 and the symbol 9), and the PUCCH resource 7 (occupying the symbol 10 and the symbol 11) are four overlapping PUCCH resources in the seven PUCCH resources. Any one of the four PUCCH resources can find at least one PUCCH resource that overlaps the PUCCH resource from the four PUCCH resources, and the four PUCCH resources do not overlap remaining three PUCCH resources in the seven PUCCH resources. For example, the PUCCH resource 4 overlaps the PUCCH resource 6, the PUCCH resource 5 overlaps both the PUCCH resource 6 and the PUCCH resource 7, the PUCCH resource 6 overlaps both the PUCCH resource 4 and the PUCCH resource 5, and the PUCCH resource 7 overlaps the PUCCH resource 5.

In other words, if the H PUCCH resources in the R PUCCH resources overlap in time domain, the target PUCCH resource need to be selected, to send, on the target PUCCH resources, the HARQ feedback information of the PDSCHs corresponding to the H PUCCH resources.

Two manners are provided for selecting the target PUCCH resource herein.

Manner 1

The target PUCCH resource is a PUCCH resource, at a foremost start location in time domain, in the H PUCCH resources. In this case, when uplink control resources overlap, a PUCCH resource at a foremost start location in time domain may be selected, to ensure that the HARQ feedback information of the PDSCHs corresponding to the H PUCCH resources can be sent in time. This can be applicable to a scenario in which a feedback latency required for HARQ feedback information of a downlink control channel is relatively short, ensuring a low service latency.

For example, in the example in FIG. 4, it is assumed that the H PUCCH resources are PUCCH resources numbered 1 to 3. In this case, a PUCCH resource at a foremost time domain location, namely, the PUCCH resource 1, may be selected. Alternatively, it is assumed that the H PUCCH resources are PUCCH resources numbered 4 to 7. In this case, the PUCCH resource at the foremost time domain location, namely, the PUCCH resource 4, may be selected.

Alternatively, the target PUCCH resource is a PUCCH resource, at a rearmost start location in time domain, in the H PUCCH resources. In this case, when the uplink control resources overlap, a PUCCH resource at a rearmost start location in time domain may be selected, to ensure that the HARQ feedback information of the PDSCHs corresponding to the H PUCCH resources can be normally sent. This can be applicable to a scenario in which a feedback latency required for HARQ feedback information of a PDSCH is relatively long. Sufficient processing time may be reserved for the terminal device, so that all HARQ feedback information in the overlapping H PUCCH resources is packaged and fed back together, to ensure that the HARQ feedback information can be smoothly fed back.

For example, in the example in FIG. 4, it is assumed that the H PUCCH resources are the PUCCH resources numbered 1 to 3. In this case, a PUCCH resource at a rearmost time domain location, namely, the PUCCH resource 2, may be selected. Alternatively, it is assumed that the H PUCCH resources are the PUCCH resources numbered 4 to 7. In this case, the PUCCH resource at the rearmost time domain location, namely, the PUCCH resource 7, may be selected.

Alternatively, the target PUCCH resource is a PUCCH resource in the H PUCCH resources that meets a feedback latency required for sending HARQ feedback information corresponding to the PDSCHs corresponding to the H PUCCH resources.

The feedback latency required for the HARQ feedback information corresponding to the PDSCHs corresponding to the H PUCCH resources is a minimum quantity of time units, for example, a minimum quantity of symbols, between an end location of a time unit in which the PDSCH at the rearmost time domain location in all the PDSCHs corresponding to all the H PUCCH resources is located and a start time unit of a PUCCH for sending the HARQ feedback information corresponding to all the PDSCHs. For ease of description, it may be assumed herein that the feedback latency is T symbols.

The PUCCH resource that meets the feedback latency required for the HARQ feedback information means that a quantity of symbols between a time domain location corresponding to the PUCCH resource and the end location of the time unit in which the rearmost PDSCH is located is greater than or equal to the feedback latency T. In addition, finally, a PUCCH resource at a foremost location in time domain may be selected as the target PUCCH resource from all PUCCH resources that are in the H PUCCH resources and that can meet the feedback latency. In this way, it can be ensured that the terminal device has sufficient time to perform combined feedback processing on a plurality of pieces of HARQ feedback information, to ensure that the plurality of pieces of HARQ feedback information are smoothly sent. In addition, the earliest PUCCH resource that meets the feedback latency is selected, to reduce the latency as much as possible.

For example, it is assumed that H=3 PUCCH resources overlap, and the three PUCCH resources correspond to three PDSCHs. An end symbol of a PDSCH at a rearmost location in time domain is a symbol k. There are t symbols between the symbol k and a start symbol of the earliest PUCCH that can send HARQ feedback information corresponding to the three PDSCHs. In other words, the HARQ feedback information can be sent only after the symbol k is added with T symbols. In this way, only a PUCCH resource after a time domain location corresponding to a symbol that obtained by adding the T symbols to the symbol k can meet the feedback latency.

For example, in the example in FIG. 4, the H PUCCH resources are the PUCCH resource 1 to the PUCCH resource 3 in FIG. 4, and HARQ feedback information carried in the three PUCCH resources needs to be fed back together. It takes time for the terminal device to combine these pieces of HARQ feedback information for feedback. It is assumed that sending the HARQ feedback information on the PUCCH resource 1 cannot meet the latency, and sending the HARQ feedback information on the PUCCH resource 2 meets the latency. In this case, the PUCCH resource 3 is selected as the target PUCCH resource, to send the HARQ feedback information. Although the PUCCH resource 2 can also meet the latency, the PUCCH resource 3 is before the PUCCH resource 2 in time domain. Therefore, the PUCCH resource 3 is selected as the target PUCCH resource, to transmit the HARQ feedback information carried in the three PUCCH resources, to reduce the latency.

Alternatively, the target PUCCH resource is a PUCCH resource with a highest priority in the H PUCCH resources. Herein, the priority refers to a priority of a PDSCH corresponding to the PUCCH resource. In this case, when the uplink control resources overlap, a PUCCH resource whose corresponding PDSCH has a highest priority may be selected, to ensure that the HARQ feedback information of the PDSCHs corresponding to the H PUCCH resources can be normally sent. Because a PUCCH resource with a relatively high priority is originally used to send HARQ feedback information of a PDSCH with a relatively high priority, to ensure reliability of the PDSCH with the relatively high priority, the PUCCH resource with the relatively high priority occupies a relatively large quantity of time-frequency resources. In other words, HARQ feedback information sent on the PUCCH resource with the relatively high priority can implement a relatively low code rate, to ensure that the HARQ feedback information of the PDSCHs corresponding to the H PUCCH resources can be sent with relatively high reliability.

Optionally, the priority of the PDSCH may be determined based on an active PDCCH corresponding to the PDSCH.

Optionally, a manner includes: The priority of the PDSCH is determined based on a priority indication field in the active PDCCH. For example, the active PDCCH includes 3 bits, and may indicate a total of eight priorities. Optionally, a smaller value of the priority indicated by the active PDCCH indicates a higher priority of the PDSCH indicated by the PDCCH. Alternatively, a larger value of the priority indicated by the active PDCCH indicates a higher priority of the PDSCH indicated by the PDCCH. For example, a bit sequence being 000 indicates a highest priority, and a bit sequence being 111 indicates a lowest priority. For another example, the bit sequence being 000 indicates the lowest priority, and the bit sequence being 111 indicates the highest priority.

Optionally, a manner includes: The priority of the PDSCH is determined based on a transmission parameter group indication field in the active PDCCH. A smaller identifier value of a transmission parameter group indicates a higher priority of a PDSCH corresponding to the transmission parameter group. It is assumed that the active PDCCH includes 3 bits, and may indicate a total of eight transmission parameter groups. Optionally, a smaller value of the transmission parameter group indicated by the active PDCCH indicates a higher priority of the PDSCH indicated by the PDCCH. Alternatively, a larger value of the transmission parameter group indicated by the active PDCCH indicates a higher priority of the PDSCH indicated by the PDCCH. For example, the bit sequence being 000 indicates that a priority of a transmission parameter group corresponding to the bit sequence is the highest. The bit sequence being 111 indicates that a priority of a transmission parameter group corresponding to the bit sequence is the lowest. For another example, the bit sequence being 000 indicates that the priority of the transmission parameter group corresponding to the bit sequence is the lowest. The bit sequence being 111 indicates that the priority of the transmission parameter group corresponding to the bit sequence is the highest.

Optionally, a manner includes: The priority of the PDSCH is determined based on a time domain resource indication field of data in the active PDCCH. A shorter time domain length L indicated by the time domain resource indication field indicates a higher priority of the corresponding PDSCH. For example, it is assumed that a time domain length indicated by the time domain resource indication field included in the active PDCCH is 7. In this case, the priority of the PDSCH corresponding to the time domain length is the lowest. Alternatively, it is assumed that the time domain length L indicated by the time domain resource indication field included in the active PDCCH is 2. In this case, the priority of the PDSCH corresponding to the time domain length is the highest.

Optionally, a manner includes: The priority of the PDSCH is determined based on a time domain location of the active PDCCH. A later time domain location of the active PDCCH indicates a higher priority. For example, it is assumed that a time domain location of an active PDCCH is on a symbol 0, and a time domain location of another active PDCCH is on a symbol 4. In this case, a priority of the time domain location of the active PDCCH on the symbol 4 is higher than that of the active PDCCH on the symbol 1.

Optionally, the priority of the PDSCH may be determined based on a time domain location of the PDSCH. A later time domain location of the PDSCH corresponds to a higher priority of the PDSCH. For example, it is assumed that a time domain location of the PDSCH 1 is on a symbol 1 in a slot 1, and a time domain location of the PDSCH 2 is on a symbol 5 in the slot 1. In this case, a priority of the PDSCH 2 is higher than a priority of the PDSCH 1.

Alternatively, the target PUCCH resource is a PUCCH resource with a lowest priority in the H PUCCH resources. In this case, when the uplink control resources overlap, a PUCCH resource whose corresponding PDSCH has a lowest priority may be selected, to ensure that the HARQ feedback information of the PDSCHs corresponding to the H PUCCH resources can be normally sent. The PUCCH resource with the lowest priority may occupy a relatively small quantity of time-frequency resources. Therefore, when there is an overlap, the PUCCH resource with the lowest priority is selected to send the HARQ feedback information, so that overheads of uplink resources can be reduced.

It should be understood that the foregoing methods for selecting the target PUCCH resource may be used in combination when there is no conflict and logic is proper. This is not limited in this embodiment of this application. For example, if there are a plurality of PUCCH resources with the highest priority in the H PUCCH resources, a PUCCH resource with a foremost start time domain may be preferentially selected as the target PUCCH resource.

It should be understood that the HARQ feedback information of the PDSCHs corresponding to the H PUCCH resources is sent on the selected target PUCCH resource. Optionally, the HARQ feedback information sent on the target PUCCH resource may be arranged in a specific sequence. The arrangement sequence of the HARQ feedback information may be one or more of the following: A transmission sequence of the PDSCHs corresponding to the HARQ feedback information is from front to rear in time domain; identifiers IDs corresponding to the PDSCHs corresponding to the HARQ feedback information are from small to large (or from large to small); or active PDCCHs corresponding to the PDSCHs corresponding to the HARQ feedback information are in a sequence from front to rear. In this way, it can be ensured that the network device can identify which PDSCHs the feedback information sent on the target PUCCH resource separately corresponds to.

For example, it is assumed that there are three PUCCH resources, and feedback information that needs to be sent on each PUCCH resource is Y1 bits, Y2 bits, and Y3 bits. In this case, HARQ feedback information of Y (where Y=Y1+Y2+Y3) bits needs to be sent on the target PUCCH resource. It is assumed that a PDSCH corresponding to the Y1 bits is transmitted first in time domain, a PDSCH corresponding to the Y2 bits is transmitted second only to the PDSCH corresponding to the Y1 bits in time domain, and a PDSCH corresponding to the Y3 bits is transmitted last in time domain. If a transmission sequence of the PDSCHs in time domain is from front to rear, an arrangement sequence of the Y-bit HARQ feedback information is: the Y1 bits, the Y2 bits, and the Y3 bits. It is assumed that an identifier of the PDSCH corresponding to the Y1 bits is 1, an identifier of the PDSCH corresponding to the Y2 bits is 2, and an identifier of the PDSCH corresponding to the Y3 bits is 3. If the identifiers of the PDSCHs are in a sequence from small to large, the arrangement sequence of the Y-bit HARQ feedback information is: the Y1 bits, the Y2 bits, and the Y3 bits. It is assumed that an active PDCCH of the PDSCH corresponding to the Y1 bits is the first in time domain, an active PDCCH of the PDSCH corresponding to the Y2 bits is second only to the active PDCCH of the PDSCH corresponding to the Y1 bits in time domain, and an active PDCCH of the PDSCH corresponding to the Y3 bits is the last in time domain. If the active PDCCHs are in a sequence from front to rear in time domain, the arrangement sequence of the Y-bit HARQ feedback information is: the Y1 bits, the Y2 bits, and the Y3 bits.

The target PUCCH resource may be insufficient to carry the HARQ feedback information of the PDSCHs corresponding to the H PUCCH resources. In other words, the target PUCCH resource can carry a maximum quantity of X bits of feedback information, but the HARQ feedback information of the PDSCHs corresponding to the H PUCCH resources is Y bits in total, where Y is greater than X. In this case, the Y bits may be arranged in a specific sequence, the first X bits in the Y bits are carried on the target PUCCH resource for sending, and remaining Y-X bits in the Y bits are discarded. In other words, the HARQ feedback information of the PDSCHs corresponding to the H PUCCH resources needs to be arranged in a specific sequence. Then, the HARQ feedback information is carried according to the arrangement sequence of the HARQ feedback information. To be specific, if HARQ feedback information that is later in the arrangement sequence cannot be carried on the target PUCCH resource, the HARQ feedback information is discarded. In this way, it can be ensured that HARQ feedback information arranged in front can be normally sent. In addition, it is ensured that data scheduling is performed on the HARQ feedback information arranged in the front, to maximize use of the uplink resources.

Manner 2

The network device may configure a plurality of PUCCH resources for the terminal device. The terminal device may select the target PUCCH resource from the plurality of PUCCH resources, to send HARQ feedback information of PDSCHs corresponding to overlapping PUCCH resources.

Optionally, the method 300 further includes:

The network device sends second information to the terminal device, where the second information includes G pieces of resource indication information, each of the G pieces of resource indication information indicates one PUCCH resource, and G is an integer greater than or equal to 2. Correspondingly, the terminal device receives the second information, and then determines, based on a total quantity of bits of the HARQ feedback information of the PDSCHs corresponding to the H PUCCH resources, one PUCCH resource from G PUCCH resources indicated by the G pieces of resource indication information as the target PUCCH resource. Correspondingly, the terminal device receives the second information.

Optionally, the network device may send the second information to the terminal device by using higher layer signaling. Correspondingly, the terminal device receives the higher layer signaling, and the higher layer signaling includes the second information.

Correspondingly, the network device may alternatively determine one of the G PUCCH resources as the target PUCCH resource based on the total quantity of bits of the HARQ feedback information of the PDSCHs corresponding to the H PUCCH resources. A PUCCH resource that is in the G PUCCH resources and that can carry the total quantity of bits of the HARQ feedback information of the PDSCHs corresponding to the H PUCCH resources and that has a smallest resource quantity is the target PUCCH resource. Therefore, the selected target PUCCH resource can carry the HARQ feedback information of the PDSCHs corresponding to the H PUCCH resources. In this way, it can be ensured that all the HARQ feedback information of the PDSCHs corresponding to the H PUCCH resources can be smoothly fed back, to ensure that the network device normally receives the HARQ feedback information and performs scheduling for retransmission in time. This ensures data reliability and a latency.

If the H PUCCH resources in the R PUCCH resources overlap in time domain, the terminal device or the network device may select, from the G PUCCH resources based on the total quantity of bits of the HARQ feedback information of the PDSCHs corresponding to the H PUCCH resources, one PUCCH resource that can meet the total quantity of bits of the HARQ feedback information of the PDSCHs corresponding to the H PUCCH resources as the target PUCCH resource.

For example, the second information indicates G=6 PUCCH resources. It is assumed that bits that can be carried on each PUCCH resource correspond to one bit interval. For example, bit intervals are successively as follows: A first PUCCH resource can carry 1 to 10 bits, a second PUCCH resource can carry 11 to 20 bits, a third PUCCH resource can carry 21 to 30 bits, a fourth PUCCH resource can carry 31 to 40 bits, a fifth PUCCH resource can carry 41 to 50 bits, and a sixth PUCCH resource can carry 51 to 60 bits. If a quantity of bits of HARQ feedback information is 1 to 10 bits, the first PUCCH resource in the six PUCCH resources is selected. If a quantity of bits of HARQ feedback information is 11 to 20 bits, the HARQ feedback information corresponds to the second PUCCH resource. By analogy, if a quantity of bits of HARQ feedback information is 51 to 60 bits, the HARQ feedback information corresponds to the sixth PUCCH resource. For example, if the total quantity of bits of the HARQ feedback information of the PDSCHs corresponding to the H PUCCH resources is 35 bits, the fourth PUCCH resource in the six resources is selected as the target PUCCH resource.

It should be understood that each of the G PUCCH resources may correspond to one feedback information bit interval. A specific correspondence may be predefined according to a protocol, or may be indicated in the second information. This is not limited in this embodiment of this application.

It should be understood that the HARQ feedback information of the PDSCHs corresponding to the H PUCCH resources is sent on the selected target PUCCH resource. Herein, the HARQ feedback information sent on the target PUCCH resource may be arranged in a specific sequence. The arrangement sequence of the HARQ feedback information sent on the target PUCCH resource may be one or more of the following: The transmission sequence of the PDSCHs corresponding to the HARQ feedback information is from front to rear in time domain; the identifiers IDs corresponding to the PDSCHs corresponding to the HARQ feedback information are from small to large (or from large to small); or the active PDCCHs corresponding to the PDSCHs corresponding to the HARQ feedback information are in the sequence from front to rear. In this way, it can be ensured that the network device can identify which PDSCH the HARQ feedback information sent on the target PUCCH resource separately corresponds to. For a specific explanation of the arrangement sequence of the HARQ feedback information sent on the target PUCCH resource, refer to the description in Manner 1. For brevity, details are not described herein again.

Optionally, in still another implementation, before sending the HARQ feedback information corresponding to the K PDSCHs by using the R PUCCH resources, the terminal device may first determine whether the R PUCCH resources overlap. If there is no overlap, the HARQ feedback information of the PDSCH corresponding to each of the R PUCCH resources is sent on the PUCCH resource. If there is an overlap, HARQ feedback information of PDSCHs corresponding to some PUCCH resources may be sent, and sending of HARQ feedback information of PDSCHs corresponding to some other PUCCH resources may be canceled.

For example, if the H PUCCH resources in the R PUCCH resources indicated by the resource indication information in the R transmission parameter groups overlap in time domain, HARQ feedback information of a PDSCH corresponding to a first PUCCH resource is sent on the first PUCCH resource, and sending of HARQ feedback information of a PDSCH corresponding to a second PUCCH resource is canceled. The first PUCCH resource and the second PUCCH resource are different PUCCH resources in the H PUCCH resources, and the first PUCCH resource is a part or all of the first transmission resource.

It should be understood that quantities of resources included in the first PUCCH resource and the second PUCCH resource are not limited in this embodiment of this application.

The following describes a relationship that the first PUCCH resource and the second PUCCH resource may meet.

Optionally, a priority of the first PUCCH resource is higher than a priority of the second PUCCH resource. Herein, the priority is a priority of a PDSCH corresponding to the PUCCH resource. The priority of the PDSCH may be determined according to the foregoing method. If a priority of the PDSCH corresponding to the first PUCCH resource is higher than a priority of the PDSCH corresponding to the second PUCCH resource, the terminal device sends, on the first PUCCH resource, the HARQ feedback information of the PDSCH corresponding to the first PUCCH resource, and cancels sending of the HARQ feedback information of the PDSCH corresponding to the second PUCCH resource. In this way, when PUCCH resources overlap (where the overlap may also be understood as a collision), it may be preferentially ensured that HARQ feedback information of a PDSCH with a higher priority can be preferentially sent, to ensure transmission reliability of a service with a higher priority.

Figure 5:
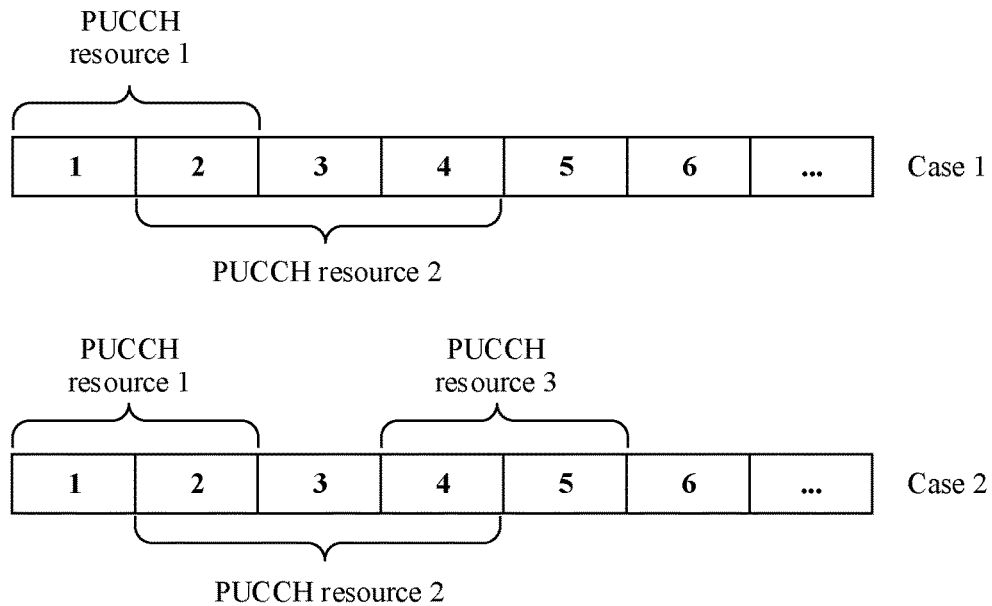
FIG. 5 is another example diagram of a PUCCH resource according to an embodiment of this application.

Description is provided herein with reference to an example in FIG. 5. As shown in FIG. 5, in a case 1, a PUCCH resource 1 occupies a symbol 1 and a symbol 2, and a PUCCH resource 2 occupies the symbol 2, a symbol 3, and a symbol 4. To be specific, an overlapping part between the PUCCH resource 1 and the PUCCH resource 2 is the symbol 2. It is assumed that a priority of a PDSCH corresponding to the PUCCH resource 1 is higher than a priority of a PDSCH corresponding to the PUCCH resource 2. In this case, HARQ feedback information of the PDSCH corresponding to the PUCCH resource 1 is sent, and HARQ feedback information of the PDSCH corresponding to the PUCCH resource 2 is discarded. Alternatively, it is assumed that the priority of the PDSCH corresponding to the PUCCH resource 1 is lower than the priority of the PDSCH corresponding to the PUCCH resource 2. In this case, the HARQ feedback information of the PDSCH corresponding to the PUCCH resource 2 is sent, and the HARQ feedback information of the PDSCH corresponding to the PUCCH resource 1 is discarded.

As shown in FIG. 5, in a case 2, the PUCCH resource 1 occupies the symbol 1 and the symbol 2, the PUCCH resource 2 occupies the symbol 2, the symbol 3, and the symbol 4, and a PUCCH resource 3 occupies the symbol 4 and a symbol 5. To be specific, an overlapping part between the PUCCH resource 1 and the PUCCH resource 2 is the symbol 2, and an overlapping part between the PUCCH resource 2 and the PUCCH resource 3 is the symbol 4. In other words, the three PUCCH resources overlap in time domain. If the priority of the PDSCH corresponding to the PUCCH resource 1 is higher than the priority of the PDSCH corresponding to the PUCCH resource 2, the HARQ feedback information of the PDSCH corresponding to the PUCCH resource 1 is sent on the PUCCH resource 1, and the HARQ feedback information of the PDSCH corresponding to the PUCCH resource 2 is discarded. In this case, because the PUCCH resource 1 does not overlap the PUCCH resource 3, HARQ feedback information of a PDSCH corresponding to the PUCCH resource 3 may also be sent. If the priority of the PDSCH corresponding to the PUCCH resource 1 is lower than the priority of the PDSCH corresponding to the PUCCH resource 2, the HARQ feedback information of the PDSCH corresponding to the PUCCH resource 1 is discarded, and then priorities of the PDSCHs corresponding to the PUCCH resource 2 and the PUCCH resource 3 may continue to be compared. If the priority corresponding to the PUCCH resource 2 is lower than the priority of the PDSCH corresponding to the PUCCH resource 3, the HARQ feedback information of the PDSCH corresponding to the PUCCH resource 3 is sent, and the HARQ feedback information of the PDSCH corresponding to the PUCCH resource 2 is discarded. Alternatively, if the priority corresponding to the PUCCH resource 2 is higher than the priority of the PDSCH corresponding to the PUCCH resource 3, the HARQ feedback information of the PDSCH corresponding to the PUCCH resource 2 is sent, and the HARQ feedback information of the PDSCH corresponding to the PUCCH resource 3 is discarded.

Alternatively, a transmission period of the PDSCH corresponding to the first PUCCH resource is shorter than a transmission period of the PDSCH corresponding to the second PUCCH resource. To be specific, if the transmission period of the PDSCH corresponding to the first PUCCH resource is shorter than the transmission period of the PDSCH corresponding to the second PUCCH resource, the terminal device sends, on the first PUCCH resource, the HARQ feedback information of the PDSCH corresponding to the first PUCCH resource, and cancels sending of the HARQ feedback information of the PDSCH corresponding to the second PUCCH resource. In this way, when the uplink control resources overlap, it can be ensured that HARQ feedback information of a PDSCH with a relatively short transmission period can be preferentially sent, to ensure service transmission reliability. In addition, the PDSCH with a relatively short transmission period also has a relatively urgent latency requirement. Therefore, the HARQ feedback information of the PDSCH with a relatively short transmission period is preferentially sent, so that a service transmission latency can be ensured.

Alternatively, an identifier of a transmission parameter group corresponding to the first PUCCH resource is less than an identifier of a transmission parameter group corresponding to the second PUCCH resource. To be specific, if the identifier of the transmission parameter group corresponding to the first PUCCH resource is less than the identifier of the transmission parameter group corresponding to the second PUCCH resource, the terminal device sends, on the first PUCCH resource, the HARQ feedback information of the PDSCH corresponding to the first PUCCH resource, and cancels sending of the HARQ feedback information of the PDSCH corresponding to the second PUCCH resource. In this way, when the PUCCH resources overlap, it can be ensured that HARQ feedback information of a PDSCH whose transmission parameter group has a smaller identifier can be preferentially sent, to ensure service transmission reliability. A downlink control channel whose transmission parameter group has a smaller identifier may be a relatively important PDSCH with a relatively high priority. Sending HARQ feedback information corresponding to the PDSCH with a relatively high priority can preferentially ensure reliability and a latency of a high-priority service.

Alternatively, a time domain location at which an active PDCCH of the PDSCH corresponding to the first PUCCH resource is located is later than a time domain location at which an active PDCCH of the PDSCH corresponding to the second PUCCH resource is located. To be specific, if the time domain location at which the active PDCCH of the PDSCH corresponding to the first PUCCH resource is located is later than the time domain location at which the active PDCCH of the PDSCH corresponding to the second PUCCH is located, the terminal device sends, on the first PUCCH resource, the HARQ feedback information of the PDSCH corresponding to the first PUCCH resource, and cancels sending of the HARQ feedback information of the PDSCH corresponding to the second PUCCH resource. In this way, when the PUCCH resources overlap, it can be ensured that HARQ feedback information of a PDSCH corresponding to an active PDCCH at a later time domain location can be preferentially sent. In other words, HARQ feedback information of a PDSCH that is later activated can be sent in time, to ensure service transmission reliability. This is because when the network device sends a subsequent active PDCCH, the network device already knows, based on a resource indication, that the PUCCH resources overlap, but still sends the active PDCCH. This indicates that a PDSCH corresponding to the PDCCH that is activated later is relatively urgent. In other words, a requirement on a latency is relatively high, that is, the latency is lower. Therefore, HARQ feedback information of the PDSCH corresponding to the PDCCH that is activated later is preferentially sent, so that a latency requirement of a service with a relatively urgent latency can be met.

The foregoing describes a case in which a priority of a PUCCH resource, a transmission period of a PDSCH corresponding to the PUCCH resource, or an identifier of a transmission parameter group corresponding to the PUCCH resource is used as a measurement factor to choose to send or cancel sending of HARQ feedback information of a PDSCH corresponding to a specific PUCCH resource. It should be understood that the foregoing three measurement factors may alternatively be used in combination. To be specific, a plurality of the foregoing three measurement factors may be used to choose to send or cancel sending of HARQ feedback information of a PDSCH corresponding to a specific PUCCH resource.

For example, the terminal device may choose, based on a priority of a PUCCH resource and a transmission period of a PDSCH corresponding to the PUCCH resource, to send or cancel sending of HARQ feedback information of a PDSCH corresponding to a specific PUCCH resource. If the terminal device first performs selection based on the priority of the PUCCH resource, and priorities of PUCCH resources are the same, the terminal device further performs selection based on transmission periods of PDSCHs corresponding to the PUCCH resources.

Therefore, in the first possible implementation, when a plurality of PUCCH resources overlap, HARQ feedback information of a PDSCH is sent by defining a rule, to ensure that the terminal device and the network device have consistent understanding, so as to ensure normal communication. In other words, the HARQ feedback information is normally sent, to ensure that HARQ feedback information of a high-priority service or a service that has a relatively high reliability and latency requirement is sent in time, so as to ensure reliability and a latency.

Second Possible Implementation

The first transmission resource is one PUCCH resource. The terminal device may send, on the PUCCH resource, HARQ feedback information corresponding to the K PDSCHs.

Optionally, the first information further includes first resource indication information, and the first resource indication information is used to indicate the first transmission resource.

In other words, the network device may directly indicate one PUCCH resource to the terminal device by using the first resource indication information, so that the terminal device can send the HARQ feedback information corresponding to the K PDSCHs. A quantity of bits that can be carried in the first PUCCH resource may meet the total quantity of bits of the HARQ feedback information corresponding to the K PDSCHs. For example, the quantity of bits that can be carried in the first PUCCH resource is at least greater than 2 bits.

Optionally, on the first transmission resource, not only the HARQ feedback information corresponding to the K PDSCHs needs to be sent, but also HARQ feedback information corresponding to a dynamically scheduled PDSCH may be sent. The dynamically scheduled PDSCH refers to a PDSCH whose corresponding PDCCH needs to be sent each time new data is transmitted.

The terminal device may add the HARQ feedback information corresponding to the K PDSCHs after the HARQ feedback information corresponding to the dynamically scheduled PDSCH, to generate new HARQ feedback information, which is referred to as a HARQ-ACK codebook, and then send the new HARQ feedback information on the first transmission resource.

Optionally, the first transmission resource may be determined based on a quantity of bits in the HARQ-ACK codebook.

Optionally, the network device may send third information to the terminal device by using higher layer signaling. The third information indicates F PUCCH resource sets, and F is a positive integer.

Correspondingly, the terminal device receives the third information. The terminal device may determine one PUCCH resource set from the F PUCCH resource sets based on the total quantity of bits in the HARQ-ACK codebook, and then select one PUCCH resource from the PUCCH resource set as the first transmission resource. A manner in which the terminal device selects one PUCCH resource from the PUCCH resource set may be: determining based on a PDCCH at a rearmost time domain location in all PDCCHs that correspond to the dynamically scheduled PDSCH and the K PDSCHs. The rearmost PDCCH includes a bit field, to indicate that one PUCCH resource in the PUCCH resource set is the first transmission resource.

Correspondingly, the network device determines one PUCCH resource in the F PUCCH resource sets as the first transmission resource based on the total quantity of bits in the HARQ-ACK codebook.

The first transmission resource is determined based on the total quantity of bits in the HARQ-ACK codebook and the last PDCCH. Therefore, HARQ feedback information of all PDSCHs can be transmitted on the first transmission resource, and it can be ensured that all the HARQ feedback information can be smoothly fed back, to ensure that the network device normally receives the HARQ feedback information and performs scheduling for retransmission in time. This ensures data reliability and a latency.

Third Possible Implementation

In the third possible implementation, the terminal device also sends, on one PUCCH resource, the HARQ feedback information corresponding to the K PDSCHs. A difference from the second possible implementation is that the terminal device needs to select an appropriate PUCCH resource from a plurality of PUCCH resources to send the HARQ feedback information corresponding to the K PDSCHs.

The first information further includes N pieces of resource indication information. Each of the N pieces of resource indication information indicates one PUCCH resource, and N is an integer greater than 1. Correspondingly, that the first transmission resource is determined based on the first information includes: One PUCCH resource is determined, from N PUCCH resources indicated by the N pieces of resource indication information, as the first transmission resource based on the total quantity of bits of the HARQ feedback information corresponding to the K PDSCHs.

In other words, the network device may configure a plurality of PUCCH resources for the terminal device, so that the terminal device selects, from the plurality of PUCCH resources, one PUCCH resource that meets the total quantity of bits of the feedback information corresponding to the K PDSCHs, and sends, on the selected PUCCH resource, the HARQ feedback information corresponding to the K PDSCHs. A quantity of bits that can be carried on the PUCCH resource selected by the terminal device may meet the total quantity of bits of the HARQ feedback information corresponding to the K PDSCHs. For example, the quantity of bits that can be carried on the PUCCH resource selected by the terminal device is at least greater than 2.

Correspondingly, the network device may alternatively determine one of the N PUCCH resources as the first transmission resource based on the total quantity of bits of the HARQ feedback information of the K PDSCHs. A PUCCH resource that is in the N PUCCH resources and that can carry the total quantity of bits of the HARQ feedback information of the K PDSCHs and that has a smallest quantity of resources is the first transmission resource.

In the second possible implementation or the third possible implementation, the terminal device sends, on one PUCCH resource, the HARQ feedback information corresponding to the K PDSCHs. Herein, for the HARQ feedback information that corresponds to the K PDSCHs and that is sent on one PUCCH resource, a sending format of the HARQ feedback information may be predefined, for example, the quantity of bits of the HARQ feedback information corresponding to the K PDSCHs and an arrangement sequence of the bits. The following describes, in two manners, the quantity of bits of the HARQ feedback information corresponding to the K PDSCHs and the arrangement sequence of the bits.

Manner 1:

Optionally, that the terminal device sends, on the first transmission resource, HARQ feedback information corresponding to the K PDSCHs includes: The terminal device sends only the HARQ feedback information of the K PDSCHs on the first transmission resource.

Alternatively, the terminal device sends HARQ feedback information of all activated PDSCHs on the first transmission resource, where all the activated PDSCHs include the K PDSCHs. The activated PDSCHs mean that the network device sends a plurality of activated active PDCCHs to the terminal device, each PDCCH schedules one PDSCH, and time units in which the plurality of PDSCHs are located may be determined based on a transmission period. In the time units in which all the PDSCHs indicated by all the active PDCCHs are located, PDSCHs are received in time units in which some PDSCHs are located, and PDSCHs may not be received in time units in which some other PDSCHs are located. However, these PDSCHs (including the received PDSCHs and the PDSCHs that are not received) need to send HARQ feedback information in a same time unit. In time units in which these PDSCHs that need to send the HARQ feedback information in the same time unit are located, PDSCHs that are potentially received are all the activated PDSCHs. In these time units, although PDSCHs are received in only K time units, each of the time units corresponds to one piece of HARQ feedback information. If data is received in a time unit, corresponding feedback information (an ACK or a NACK) is sent. If no corresponding data is received, the feedback information corresponding to the time unit is the NACK. In this way, it can be ensured that a quantity of bits of the HARQ feedback information is fixed, and the total quantity of bits of the feedback information does not change even if a piece of data is not received. This ensures reliability of sending the HARQ feedback information. In other words, even if PDSCHs are not received in time units in which some PDSCHs are located, feedback locations of corresponding HARQ information are reserved for the PDSCHs that are not received.

Alternatively, the terminal device sends, on the first transmission resource, HARQ feedback information of PDSCHs corresponding to the M transmission parameter groups, where the PDSCHs corresponding to the M transmission parameter groups include the K PDSCHs.

Figure 6:
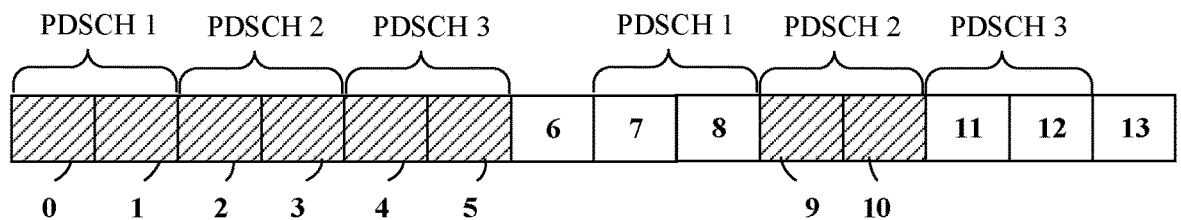
FIG. 6 is an example diagram of a PDSCH according to an embodiment of this application.

Herein, the HARQ feedback information sent on the first transmission resource is described with reference to an example in FIG. 6. As shown in FIG. 6, it is assumed that four SPS configurations are configured and correspond to four transmission parameter groups (namely, M is equal to 4), and the network device activates three SPS configurations. PDSCHs 1 represent PDSCHs corresponding to a first group of transmission parameter, namely, a first group of activated PDSCHs. PDSCHs 2 represent PDSCHs corresponding to a second group of transmission parameters, namely, a second group of activated PDSCHs. PDSCHs 3 represent PDSCHs corresponding to a third group of transmission parameters, namely, a third group of activated PDSCHs. In other words, there are a total of six activated PDSCHs. A transmission period of a PDSCH corresponding to each SPS configuration is seven symbols. It is assumed that the terminal device receives four PDSCHs (namely, K is equal to 4), and time domain resource locations of the four PDSCHs are shown in shadow parts in the figure. To be specific, one PDSCH is received at each of a first PDSCH 1 and a first PDSCH 3, and one PDSCH is received at each of two PDSCHs 2. Optionally, if a PDSCH is received, the terminal device sends corresponding HARQ feedback information (an ACK/NACK), and fills N in a corresponding location at which no data is received.

For the PDSCHs shown in FIG. 6, the HARQ feedback information sent on the first transmission resource may be defined to include HARQ feedback information of PDSCHs corresponding to all activated SPS configurations. It is assumed that HARQ feedback information of the PDSCH corresponding to each SPS configuration occupies 2 bits. In this case, HARQ feedback information of PDSCHs corresponding to the three activated SPS configurations occupies 6 bits.

Alternatively, for the PDSCHs shown in FIG. 6, the HARQ feedback information sent on the first transmission resource may be defined to include the HARQ feedback information of the PDSCHs corresponding to the M transmission parameter groups. It is assumed that the HARQ feedback information of the PDSCH corresponding to each SPS configuration occupies 2 bits. In this case, HARQ feedback information of PDSCHs corresponding to the four configured SPS configurations occupies 8 bits.

Alternatively, for the PDSCHs shown in FIG. 6, the HARQ feedback information sent on the first transmission resource may be defined to include only HARQ feedback information of PDSCHs corresponding to K transmission parameter groups. It is assumed that four PDSCHs are received. In this case, HARQ feedback information of the four PDSCHs occupies 4 bits.

In the second possible implementation or the third possible implementation, the HARQ feedback information sent on the first transmission resource may be carried on the first transmission resource in a sequence based on one or more of the following items: Priorities of the PDSCHs corresponding to the HARQ feedback information are from high to low (or from low to high); a transmission sequence of the PDSCHs corresponding to the HARQ feedback information is from front to rear in time domain; or identifiers (ID) corresponding to the PDSCHs corresponding to the HARQ feedback information are from small to large (or from large to small).

Optionally, the HARQ feedback information sent on the first transmission resource is arranged in the following sequence: first HARQ feedback information is before second HARQ feedback information. The first HARQ feedback information and the second HARQ feedback information meet the following condition: A priority of a PDSCH corresponding to the first HARQ feedback information is higher than a priority of a PDSCH corresponding to the second HARQ feedback information; or the priority of the PDSCH corresponding to the first HARQ feedback information is the same as the priority of the PDSCH corresponding to the second HARQ feedback information, and a start location, in time domain, of the PDSCH corresponding to the first HARQ feedback information is earlier than a start location, in time domain, of the PDSCH corresponding to the second HARQ feedback information.

It should be understood that the first HARQ feedback information and the second HARQ feedback information are two different pieces of HARQ feedback information in the HARQ feedback information sent on the first transmission resource.

For example, the HARQ feedback information sent on the first transmission resource may be arranged in a sequence, from high to low, of the priorities of the corresponding PDSCHs. If the priorities of the PDSCHs corresponding to the HARQ feedback information are the same, the HARQ feedback information is arranged in the transmission sequence that is of the PDSCHs corresponding to the HARQ feedback information and that is from front to rear in time domain. The priorities of the PDSCHs may be determined according to the foregoing method, and details are not described again.

The terminal device may sequentially arrange HARQ feedback information of a plurality of PDSCHs in a sequence, from high to low, of priorities of the PDSCHs, to ensure that HARQ feedback information of a PDSCH with a relatively high priority is preferentially sent. Further, if the priorities of the plurality of PDSCHs are the same, the HARQ feedback information of the plurality of PDSCHs may be sequentially arranged in a transmission sequence of the PDSCHs in time domain, to ensure that HARQ feedback information of a PDSCH that is first transmitted is preferentially sent when the priorities are the same. In this way, it can be ensured that the terminal device sends, in the predefined arrangement sequence, the HARQ feedback information corresponding to the PDSCHs. After receiving the HARQ feedback information, the network device determines, based on the arrangement sequence of the HARQ feedback information, whether the PDSCHs are correctly decoded, and determines a subsequent scheduling policy. This can ensure normal communication.

Herein, how to sort the HARQ feedback information sent on the first transmission resource when the priorities of the PDSCHs are different is described with reference to the example in FIG. 6. With reference to the PDSCHs described in FIG. 6, it is assumed that a priority of the PDSCH 2 is higher than a priority of the PDSCH 3, and the priority of the PDSCH 3 is higher than a priority of the PDSCH 1.

With reference to the PDSCHs in FIG. 6, when the HARQ feedback information is defined to include the HARQ feedback information of the PDSCHs corresponding to all the activated SPS configurations, it is assumed that the HARQ feedback information of the PDSCH corresponding to each SPS configuration occupies 2 bits. In this case, the HARQ feedback information of the PDSCHs corresponding to the three activated SPS configurations occupies 6 bits. In other words, 6-bit HARQ feedback information needs to be fed back. The 6-bit HARQ feedback information is respectively first 2 bits, middle 2 bits, and last 2 bits in sequence. Because the priority of the PDSCH 2 is higher than the priority of the PDSCH 3 and the priority of the PDSCH 1, the first 2 bits in the 6 bits are used to feed back feedback information corresponding to the PDSCH 2. Further, a time domain sequence may be considered. In the first 2 bits, feedback information of a PDSCH that is transmitted earlier in time domain may be preferentially fed back. To be specific, HARQ feedback information corresponding to a PDSCH 2 that occupies a symbol 2 and a symbol 3 is preferentially fed back, and then feedback information of a PDSCH 2 in a symbol 9 and a symbol 10 is fed back. The middle 2 bits in the 6 bits are used to feed back HARQ feedback information corresponding to the PDSCH 3. In the middle 2 bits, HARQ feedback information of a PDSCH that is transmitted earlier in time domain may also be preferentially fed back. To be specific, HARQ feedback information corresponding to a PDSCH 3 that occupies a symbol 4 and a symbol 5 is preferentially fed back, and then HARQ feedback information of a PDSCH 3 in a symbol 11 and a symbol 12 is fed back. The last 2 bits in the 6 bits are used to feed back feedback information of the PDSCH 1. In the last 2 bits, feedback information of a PDSCH that is transmitted earlier in time domain is preferentially fed back. To be specific, feedback information corresponding to a PDSCH 1 that occupies a symbol 0 and a symbol 1 is preferentially fed back, and then feedback information of a PDSCH 1 in a symbol 7 and a symbol 8 is fed back. Only the PDSCH 1 in the symbol 0 and the symbol 1 receives data, the PDSCH 2 in the symbol 2 and the symbol 3 and the PDSCH 2 in the symbol 9 and the symbol 10 receive data, and only the PDSCH 3 in the symbol 4 and the symbol 5 receives data. Therefore, the HARQ feedback information corresponding to the PDSCH 2 in the symbol 2 and the symbol 3 and the HARQ feedback information corresponding to the PDSCH 2 in the symbol 9 and the symbol 10 are respectively filled in a first bit and a second bit; the HARQ feedback information corresponding to the PDSCH 3 in the symbol 4 and the symbol 5 is filled in a third bit; no data is received in a fourth bit, so that the NACK is filled in; the HARQ feedback information corresponding to the PDSCH 1 in the symbol 0 and the symbol 1 is filled in a fifth bit; and no data is received in a sixth bit, so that the NACK is filled in.

With reference to the PDSCHs in FIG. 6, when the HARQ feedback information is defined to include the HARQ feedback information of the PDSCHs corresponding to the M transmission parameter groups, it is assumed that the HARQ feedback information of the PDSCH corresponding to each SPS configuration occupies 2 bits. In this case, the HARQ feedback information of the PDSCHs corresponding to the four configured SPS configurations occupies 8 bits. In other words, 8-bit HARQ feedback information needs to be fed back. In addition, although a specific transmission parameter group corresponding to a PDSCH 4 is configured, the PDSCH 4 is not activated. In other words, the PDSCH 4 is not received. The 8-bit HARQ feedback information is divided into four groups of 2 bits in sequence, which are respectively a first group of bits (including the first bit and the second bit), a second group of bits (including the third bit and the fourth bit), a third group of bits (including the fifth bit and the sixth bit), and a fourth group of bits (including a seventh bit and an eighth bit). Because the priority of the PDSCH 2 is higher than the priority of the PDSCH 3, the priority of the PDSCH 1, and a priority of the PDSCH 4, the first group of bits in the 8 bits are used to feed back the feedback information corresponding to the PDSCH 2. Further, the time domain sequence may be considered. In the first group of bits, feedback information of a PDSCH that is transmitted earlier in time domain may be preferentially fed back. To be specific, the HARQ feedback information corresponding to the PDSCH 2 that occupies the symbol 2 and the symbol 3 is preferentially fed back, and then the feedback information of the PDSCH 2 in the symbol 9 and the symbol 10 is fed back. The second group of bits in the 8 bits are used to feed back the HARQ feedback information corresponding to the PDSCH 3. In the second group of bits, HARQ feedback information of a PDSCH that is transmitted earlier in time domain may also be preferentially fed back. To be specific, the HARQ feedback information corresponding to the PDSCH 3 that occupies the symbol 4 and the symbol 5 is preferentially fed back, and then the HARQ feedback information of the PDSCH 3 in the symbol 11 and the symbol 12 is fed back. The third group of bits in the 8 bits are used to feed back the feedback information of the PDSCH 1. In the third group of bits, feedback information of a PDSCH that is transmitted earlier in time domain is preferentially fed back. To be specific, the feedback information corresponding to the PDSCH 1 that occupies the symbol 0 and the symbol 1 is preferentially fed back, and then the feedback information of the PDSCH 1 in the symbol 7 and the symbol 8 is fed back. The fourth group of bits is filled with feedback information of the PDSCH 4. Only the PDSCH 1 in the symbol 0 and the symbol 1 receives data, the PDSCH 2 in the symbol 2 and the symbol 3 and the PDSCH 2 in the symbol 9 and the symbol 10 receive data, and only the PDSCH 3 in the symbol 4 and the symbol 5 receives data. Therefore, the HARQ feedback information corresponding to the PDSCH 2 in the symbol 2 and the symbol 3 and the HARQ feedback information corresponding to the PDSCH 2 in the symbol 9 and the symbol 10 are respectively filled in the first bit and the second bit; the HARQ feedback information corresponding to the PDSCH 3 in the symbol 4 and the symbol 5 is filled in the third bit; no data is received in the fourth bit, so that the NACK is filled in; the HARQ feedback information corresponding to the PDSCH 1 in the symbol 0 and the symbol 1 is filled in the fifth bit; and no data is received in the sixth bit, so that the NACK is filled in. In addition, no data is received in the seventh bit and the eighth bit, so that the NACK is filled in.

With reference to the PDSCHs in FIG. 6, when the HARQ feedback information is defined to include only the HARQ feedback information of the PDSCHs corresponding to the K transmission parameter groups, it is assumed that four PDSCHs are received. In this case, HARQ feedback information of the four PDSCHs occupies 4 bits. In other words, 4-bit HARQ feedback information needs to be fed back. The 4-bit HARQ feedback information is respectively a first bit, a second bit, a third bit, and a fourth bit in sequence. Because the priority of the PDSCH 2 is higher than the priority of the PDSCH 3 and the priority of the PDSCH 1, the first 2 bits in the 4 bits are used to feed back the feedback information corresponding to the PDSCH 2. Further, the time domain sequence may be considered. In the first 2 bits, feedback information of a PDSCH that is transmitted earlier in time domain may be preferentially fed back. To be specific, the HARQ feedback information corresponding to the PDSCH 2 that occupies the symbol 2 and the symbol 3 is preferentially fed back, and then the feedback information of the PDSCH 2 in the symbol 9 and the symbol 10 is fed back. The PDSCH 2 in the symbol 2 and the symbol 3 and the PDSCH 2 in the symbol 9 and the symbol 10 receive data. Therefore, the HARQ feedback information corresponding to the PDSCH 2 in the symbol 2 and the symbol 3 is filled in the first bit, and the HARQ feedback information corresponding to the PDSCH 2 in the symbol 9 and the symbol 10 is filled in the second bit. Because only the PDSCH 3 in the symbol 4 and the symbol 5 receives data, the HARQ feedback information corresponding to the PDSCH 3 in the symbol 4 and the symbol 5 is filled in the third bit. Because only the PDSCH 1 in the symbol 0 and the symbol 1 receives data, the HARQ feedback information corresponding to the PDSCH 1 in the symbol 0 and the symbol 1 is filled in the fourth bit.

Optionally, the HARQ feedback information sent on the first transmission resource is arranged in the following sequence: The first HARQ feedback information is before the second HARQ feedback information. An identifier of a transmission parameter group of the PDSCH corresponding to the first HARQ feedback information is less than an identifier of a transmission parameter group of the PDSCH corresponding to the second HARQ feedback information. Alternatively, the identifier of the transmission parameter group of the PDSCH corresponding to the first HARQ feedback information is the same as the identifier of the transmission parameter group of the PDSCH corresponding to the second HARQ feedback information, and the start location, in time domain, of the PDSCH corresponding to the first HARQ feedback information is earlier than the start location, in time domain, of the PDSCH corresponding to the second HARQ feedback information.

It should be understood that the first HARQ feedback information and the second HARQ feedback information are two different pieces of HARQ feedback information in the HARQ feedback information sent on the first transmission resource.

For example, the HARQ feedback information sent on the first transmission resource may be arranged in a sequence, from small to large (or from large to small), of identifiers of transmission parameter groups of the corresponding PDSCHs. If the identifiers of the transmission parameter groups of the PDSCHs corresponding to the HARQ feedback information are the same, the HARQ feedback information is arranged in the transmission sequence that is of the PDSCHs corresponding to the HARQ feedback information and that is from front to rear in time domain. For example, it is assumed that an identifier of a transmission parameter group corresponding to the PDSCH 1 is 1, an identifier of a transmission parameter group corresponding to the PDSCH 2 is 2, and an identifier of a transmission parameter group corresponding to the PDSCH 3 is 3. In this case, the arrangement sequence of the HARQ feedback information sent on the first transmission resource may be sequentially: the HARQ feedback information corresponding to the PDSCH 1, the HARQ feedback information corresponding to the PDSCH 2, and the HARQ feedback information corresponding to the PDSCH 3. Further, for HARQ feedback information corresponding to PDSCHs whose transmission parameter groups have a same identifier, for example, HARQ feedback information corresponding to a PDSCH 1 sent in a first period and HARQ feedback information corresponding to a PDSCH 1 sent in a second period, the HARQ feedback information corresponding to the PDSCH 1 sent in the first period may be preferentially fed back, and then the HARQ feedback information corresponding to the PDSCH 1 sent in the second period is sent.

Optionally, the HARQ feedback information sent on the first transmission resource is arranged in the following sequence: The first HARQ feedback information is before the second HARQ feedback information. The identifier of the transmission parameter group of the PDSCH corresponding to the first HARQ feedback information is less than the identifier of the transmission parameter group of the PDSCH corresponding to the second HARQ feedback information. Alternatively, the identifier of the transmission parameter group of the PDSCH corresponding to the first HARQ feedback information is the same as the identifier of the transmission parameter group of the PDSCH corresponding to the second HARQ feedback information, and the priority of the PDSCH corresponding to the first HARQ feedback information is higher than the priority of the PDSCH corresponding to the second HARQ feedback information.

It should be understood that the first HARQ feedback information and the second HARQ feedback information are two different pieces of HARQ feedback information in the HARQ feedback information sent on the first transmission resource.

For example, the HARQ feedback information sent on the first transmission resource may be arranged in the sequence, from small to large (or from large to small), of the identifiers of the transmission parameter groups of the corresponding PDSCHs. If the identifiers of the transmission parameter groups of the PDSCHs corresponding to the HARQ feedback information are the same, the HARQ feedback information is arranged in the sequence, from high to low, of the priorities of the PDSCHs corresponding to the HARQ feedback information. For example, it is assumed that the identifier of the transmission parameter group corresponding to the PDSCH 1 is 1, the identifier of the transmission parameter group corresponding to the PDSCH 1 is 2, and the identifier of the transmission parameter group corresponding to the PDSCH 2 is 3. In this case, the arrangement sequence of the HARQ feedback information sent on the first transmission resource may be sequentially: the HARQ feedback information corresponding to the PDSCH 1, the HARQ feedback information corresponding to the PDSCH 2, and the HARQ feedback information corresponding to the PDSCH 3. Further, for the PDSCHs whose transmission parameter groups have a same identifier, for example, the PDSCH 1 and the PDSCH 2, the priority of the PDSCH 1 may be compared with the priority of the PDSCH 2. If the priority of the PDSCH 2 is higher than the priority of the PDSCH 1, the HARQ feedback information corresponding to the PDSCH 2 may be preferentially fed back. For the priority of the PDSCH, refer to the foregoing description. Details are not described again.

Manner 2:

Optionally, that the terminal device sends, on the first transmission resource, HARQ feedback information corresponding to the K PDSCHs includes: The terminal device determines A PDSCH occasions corresponding to the K PDSCHs, where A is a positive integer less than or equal to K, and sends, on the first transmission resource, HARQ feedback information corresponding to the A PDSCH occasions.

That the terminal device determines A PDSCH occasions corresponding to the K PDSCHs includes: The terminal device determines the A PDSCH occasions based on K corresponding PDSCH resources in the K PDSCHs.

The terminal device selects, from the K PDSCH resources, a first PDSCH resource with a foremost end symbol, and then determines, from the K PDSCH resources, all PDSCH resources that overlap with the first PDSCH resource as first-type PDSCH resources. These first-type PDSCH resources are a first PDSCH occasion in the A PDSCH occasions. Then, the first-type PDSCH resources are excluded from the K PDSCH resources, a second PDSCH resource with a foremost end symbol is selected from the remaining PDSCH resources, and all PDSCH resources that overlap with the second PDSCH resource in the remaining PDSCH resources are determined as second-type PDSCH resources. These second-type PDSCH resources are a second PDSCH occasion in the A PDSCH occasions. By analogy, the A PDSCH occasions may be determined.

A meaning of overlapping between any two PDSCH resources is similar to a meaning of overlapping between PUCCH resources. For details, refer to the foregoing descriptions. For brevity, details are not described herein again.

Figure 7:
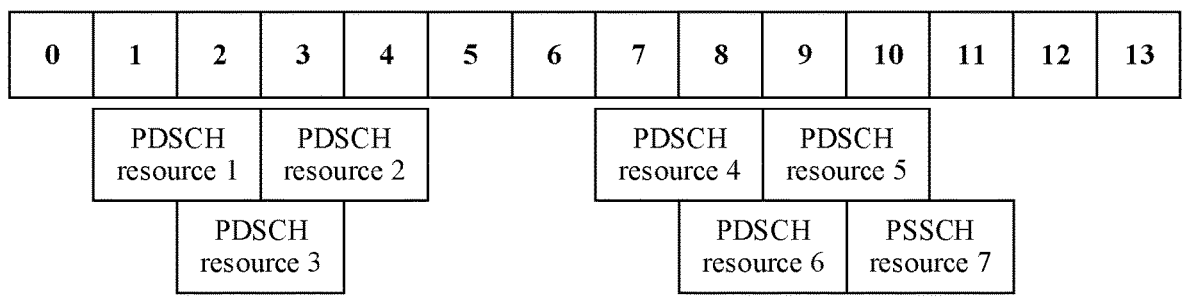
FIG. 7 is another example diagram of a PDSCH according to an embodiment of this application.

Description is provided herein with reference to an example in FIG. 7. As shown in FIG. 7, it is assumed that K is equal to 7. To be specific, feedback information of seven PDSCHs needs to be fed back together. The seven PDSCHs correspond to seven PDSCH resources, which are respectively a PDSCH resource 1 (occupying a symbol 1 and a symbol 2), a PDSCH resource 2 (occupying a symbol 3 and a symbol 4), a PDSCH resource 3 (occupying the symbol 2 and the symbol 3), a PDSCH resource 4 (occupying a symbol 7 and a symbol 8), a PDSCH resource 5 (occupying a symbol 9 and a symbol 10), a PDSCH resource 6 (occupying the symbol 8 and the symbol 9), and a PDSCH resource 7 (occupying the symbol 10 and a symbol 11). In the seven PDSCH resources, an end symbol of the PDSCH resource 1 is the foremost. A time domain resource that overlaps with the PDSCH resource 1 is the PDSCH resource 3, and the two PDSCH resources are the first PDSCH occasion. After the PDSCH resource 1 and the PDSCH resource 3 are excluded, an end symbol of the PDSCH resource 2 is the foremost. There is no time domain resource that overlaps with the PDSCH resource 2 in the remaining resources of the seven PDSCH resources. In this case, the PDSCH resource 2 is the second PDSCH occasion. After the PDSCH resources 1 to 3 are excluded, in the remaining resources of the seven PDSCH resources, an end symbol of the PDSCH resource 4 is the foremost, and a time domain resource that overlaps with the PDSCH resource 4 is the PDSCH resource 6. In this case, the PDSCH resource 4 and the PDSCH resource 6 are a third PDSCH occasion. After the PDSCH resources 1 to 4 and the PDSCH resource 6 are excluded, in the remaining resources of the seven PDSCH resources, an end symbol of the PDSCH resource 5 is the foremost, and a time domain resource that overlaps with the PDSCH resource 5 is the PDSCH resource 7. In this case, the PDSCH resource 5 and the PDSCH resource 7 are a fourth PDSCH occasion. In other words, a total of four PDSCH occasions are finally determined.

Optionally, that the HARQ feedback information corresponding to the A PDSCH occasions is sent on the first transmission resource includes: The HARQ feedback information corresponding to each of the A PDSCH occasions is sent in a sequence, of the A PDSCH occasions, that is from front to rear in time domain.

In the example shown in FIG. 7, there are four PDSCH occasions. It is assumed that 1 bit is fed back in each PDSCH occasion. In this case, 4-bit HARQ feedback information is fed back, and the 4-bit HARQ feedback information sequentially corresponds to the first PDSCH occasion to the fourth PDSCH occasion. A first bit corresponds to the PDSCH resource 1 and the PDSCH resource 3, a second bit corresponds to the PDSCH resource 2, a third bit corresponds to the PDSCH resource 4 and the PDSCH resource 6, and a fourth bit corresponds to the PDSCH resource 5 and the PDSCH resource 7.

The HARQ feedback information corresponding to each PDSCH occasion refers to an ACK or a NACK feedback information corresponding to a received PDSCH in a PDSCH resource included in the PDSCH occasion. If no PDSCH is received in the PDSCH resource included in the PDSCH occasion, the NACK is filled as the HARQ feedback information corresponding to the PDSCH occasion.

Optionally, for PDSCHs sent by the network device on a same PDSCH occasion, only one PDSCH may be received by the terminal device.

FIG. 7 is still used as an example herein. It is assumed that PDSCHs are received on the PDSCH resource 2 and the PDSCH resource 5, there are four PDSCH occasions, and 1 bit is fed back on each PDSCH occasion. In this case, 4-bit HARQ feedback information is fed back, and the 4-bit HARQ feedback information sequentially corresponds to the first PDSCH occasion to the fourth PDSCH occasion. The PDSCH resource 2 and the PDSCH resource 5 are respectively in the second PDSCH occasion and the fourth PDSCH occasion. Therefore, the second bit and the fourth bit in the 4-bit feedback information are respectively filled with HARQ feedback information of data received on the PDSCH resource 2 and the PDSCH resource 5, namely, the ACK or the NACK. However, no PDSCH is received on the remaining PDSCH resources, so that the NACK is filled. To be specific, the first bit and the third bit are both filled with NACK information.

According to the method in Manner 2, when the HARQ feedback information corresponding to the K PDSCHs is sent on the first transmission resource, the HARQ feedback information corresponding to the K PDSCHs is not directly sent in series. Instead, the HARQ feedback information corresponding to the A PDSCH occasions is sent. The A PDSCH occasions are determined based on whether the PDSCH resources corresponding to the K PDSCHs overlap, and overlapping PDSCH resources correspond to only one PDSCH occasion. Therefore, a quantity of bits for feedback is reduced, and uplink transmission resources are reduced. In other words, when a same uplink resource is used for transmission, a quantity of transmitted bits is reduced and reliability of sending uplink feedback information is improved.

Fourth Possible Implementation

Each of the M transmission parameter groups includes one piece of resource indication information, and the resource indication information indicates S PUCCH resource sets. S is a positive integer. In this way, the terminal device may send the HARQ feedback information of the K PDSCHs by using a plurality of PUCCH resources.

For example, the K PDSCHs correspond to R transmission parameter groups. Each of the R transmission parameter groups includes one piece of resource indication information, and the resource indication information indicates S PUCCH resource sets. $R \le K$, $R \le M$, and R is an integer greater than or equal to 2.

Correspondingly, that the first transmission resource is determined based on the first information includes: R PUCCH resource groups are determined based on resource indication information in the R transmission parameter groups. One PUCCH resource group includes S PUCCH resource sets. It should be noted that quantities of PUCCH resource sets included in the PUCCH resource groups may be the same, or may be different, or may be partially the same and partially different. Herein, an example in which each PUCCH resource group includes S PUCCH resource sets is used for description. The first transmission resource includes a first PUCCH resource in a first PUCCH resource set in each of the R PUCCH resource groups. In other words, the first transmission resource includes R PUCCH resources, and each of the R PUCCH resources is a PUCCH resource in a PUCCH resource set in a PUCCH resource group.

According to the method in this embodiment of this application, if the K PDSCHs correspond to R transmission parameter groups, the terminal device may determine R PUCCH resource groups by using resource indication information in the R transmission parameter groups, determine one PUCCH resource set from each of the R PUCCH resource groups, and further determine one PUCCH resource from the PUCCH resource set, to determine R PUCCH resources, so that the HARQ feedback information corresponding to the K PDSCHs can be sent by using the R PUCCH resources, to ensure that the HARQ feedback information of each PDSCH can be normally fed back. This helps improve service transmission reliability.

For example, the K PDSCHs correspond to four transmission parameter groups. Each transmission parameter group includes one piece of resource indication information, and the resource indication information indicates eight PUCCH resource sets. In this case, four PUCCH resource groups are determined based on resource indication information in the four transmission parameter groups, and each PUCCH resource group indicates eight PUCCH resource sets. A first PUCCH resource in a first PUCCH resource set in the eight PUCCH resource sets of each PUCCH resource group is a PUCCH resource used to transmit HARQ feedback information. There are four PUCCH resource groups. Therefore, the first transmission resource includes four PUCCH resources.

It should be noted that resource indication information in each transmission parameter group is independent of each other, and quantities of PUCCH resources indicated by resource indication information in different transmission parameter groups may be different. For example, a first transmission parameter group includes one piece of resource indication information, indicating four PUCCH resource sets, and a second transmission parameter group includes one piece of resource indication information, indicating eight PUCCH resource sets. Because the K PDSCHs correspond to the R transmission parameter groups, each of the R transmission parameter groups corresponds to K3 PDSCHs in the K PDSCHs, and each transmission parameter group corresponds to S PUCCH resource sets, the K3 PDSCHs also correspond to the S PUCCH resource sets. K3 is a positive integer.

When S is equal to 1, the first PUCCH resource set is a PUCCH resource set indicated by the resource indication information. Each transmission parameter group corresponds to only one PUCCH resource set. After receiving a PDSCH, the terminal device may directly send, on a PUCCH resource in the PUCCH resource set, feedback information corresponding to the PDSCH. There is no need to determine one PUCCH resource set from a plurality of PUCCH resource sets. This reduces complexity of determining the resource by the terminal device.

When S is greater than 1, one PUCCH resource set is determined from the S PUCCH resource sets as the first PUCCH resource set based on a total quantity of bits of HARQ feedback information of PDSCHs corresponding to the S PUCCH resource sets. Each of the S PUCCH resource sets may correspond to one HARQ feedback information bit quantity interval. For example, S is equal to 6. The indication information indicates six PUCCH resource sets. If the quantity of bits of the feedback information is 1 to 10 bits, a first resource set in the six PUCCH resource sets is selected. If the quantity of bits of the feedback information is 11 to 20 bits, a second resource set is selected. By analogy, if the quantity of bits of the feedback information is 51 to 60 bits, the feedback information corresponds to a sixth resource set. Each transmission parameter group corresponds to S PUCCH resource sets, and the S PUCCH resource sets are related to the quantity of bits of the HARQ feedback information. Therefore, after receiving a PDSCH, the terminal device selects one PUCCH resource set from the S PUCCH resource sets based on the quantity of bits of the HARQ feedback information, to send the HARQ feedback information. It is ensured that a finally determined PUCCH resource matches the quantity of bits of the feedback information as much as possible, thereby improving transmission efficiency.

The first PUCCH resource set is a first resource set in the S PUCCH resource sets indicated by the resource indication information, namely, a PUCCH resource set ranked first in the S PUCCH resource sets indicated by the resource indication information. Each transmission parameter group corresponds to a plurality of PUCCH resource sets. After receiving the PDSCH, the terminal device always selects, by default, a first PUCCH resource set from the plurality of PUCCH resource sets to send the feedback information. There is no need to determine a PUCCH resource set from the plurality of PUCCH resource sets according to a complex rule. This reduces complexity of determining a PUCCH resource by the terminal device, and reduces a latency.

The first PUCCH resource in the first PUCCH resource set is a resource ranked first in the first PUCCH resource set, namely, a first resource indicated in the first PUCCH resource set. After the first PUCCH resource set is determined, the first PUCCH resource is selected from a plurality of PUCCH resources in the first PUCCH resource set by default to send the feedback information. There is no need to determine a PUCCH resource from the plurality of PUCCH resource according to a complex rule. This reduces complexity of determining the PUCCH resource by the terminal device, and reduces a latency.

One PUCCH resource may be determined from the first PUCCH resource set as the first PUCCH resource based on an indication field in an active PDCCH of a PDSCH corresponding to the first PUCCH resource set. For example, the first PUCCH resource set includes four PUCCH resources, and the active PDCCH includes a 2-bit indication field. If a value of the indication field is 0, it indicates that the first PUCCH resource is a first resource of the four PUCCH resources. Alternatively, if the value of the indication field is 1, it indicates that the first PUCCH resource is a second resource. Therefore, the first PUCCH resource is indicated by using the value of the indication field. After the first PUCCH resource set is determined, the first PUCCH resource is selected from the plurality of PUCCH resources in the first PUCCH resource set based on indication information in the active PDCCH, to send the feedback information. By using the indication information, a PUCCH resource may be dynamically selected based on a quantity of bits of to-be-sent feedback information, to send the feedback information. This reduces complexity of determining the PUCCH resource by the terminal device, and can ensure that a finally determined PUCCH resource matches the quantity of bits of the feedback information as much as possible, thereby improving transmission efficiency and reducing uplink resources.

The R transmission parameter groups are transmission parameter groups in the M transmission parameter groups. If the K PDSCHs correspond to the R transmission parameter groups, the terminal device may determine the R PUCCH resources by using the resource indication information in the R transmission parameter groups, to send the HARQ feedback information corresponding to the K PDSCHs by using the R PUCCH resources, so as to ensure that the HARQ feedback information of each PDSCH can be normally fed back. This helps improve service transmission reliability.

Optionally, in an implementation, S340 includes: The terminal device sends, on each of the R PUCCH resources, HARQ feedback information of a PDSCH corresponding to the PUCCH resource.

Optionally, in another implementation, before sending the HARQ feedback information corresponding to the K PDSCHs by using the R PUCCH resources, the terminal device may first determine whether the R PUCCH resources overlap. If there is no overlap, the HARQ feedback information of the PDSCH corresponding to each of the R PUCCH resources is sent on the PUCCH resource. If there is an overlap, for PUCCH resources that overlap, a PUCCH resource needs to be selected to send HARQ feedback information of a PDSCH corresponding to the PUCCH resources that overlap.

For example, if H PUCCH resources in the R PUCCH resources overlap in time domain, HARQ feedback information of PDSCHs corresponding to the H PUCCH resources is sent on a target PUCCH resource. H≤R, and H is an integer greater than or equal to 2.

That the H PUCCH resources of the R PUCCH resources overlap in time domain and that any PUCCH resources overlap have same meanings as those in the first possible implementation. Details are not described again.

In other words, if the H PUCCH resources in the R PUCCH resources overlap in time domain, the target PUCCH resource need to be selected, to send, on the target PUCCH resources, the HARQ feedback information of the PDSCHs corresponding to the H PUCCH resources.

The following describes, in three steps, how to select the target PUCCH resource.

Step 1: Determine a first PUCCH resource group, where the first PUCCH resource group is S PUCCH resource sets indicated by the resource indication information in the first transmission parameter group. The first transmission parameter group is one of the H transmission parameter groups corresponding to the H PUCCH resources.

Optionally, the first transmission parameter group is a transmission parameter group whose corresponding PDSCH has a highest priority in the H transmission parameter groups corresponding to the H PUCCH resources. A PUCCH resource group indicated by resource indication information in the transmission parameter group corresponding to the PDSCH with the highest priority is selected as the first PUCCH resource group, so that transmission reliability of the HARQ feedback information can be higher.

The priority of the PDSCH may be determined in a manner of determining the priority of the PDSCH in the first implementation. For brevity, details are not described herein again.

Alternatively, optionally, the first transmission parameter group is a transmission parameter group with a smallest identifier in the H transmission parameter groups corresponding to the H PUCCH resources. In other words, a PUCCH resource group indicated by resource indication information in a transmission parameter group with a relatively small identifier is selected as a finally determined PUCCH resource group. Because the transmission parameter group with a relatively small identifier corresponds to a PDSCH with a relatively high priority, the PUCCH resource indicated by the transmission parameter group can achieve relatively high reliability. Therefore, the selected first PUCCH resource group can meet a higher reliability requirement, to ensure feedback information transmission reliability.

Alternatively, optionally, the first transmission parameter group is a transmission parameter group that is in the H transmission parameter groups corresponding to the H PUCCH resources and whose active PDCCH is at a rearmost time domain location. In other words, a PUCCH resource group indicated by resource indication information in a last activated transmission parameter group is selected as the first PUCCH resource group. The last activated transmission parameter group is activated by the network device. Since the network device activates the transmission parameter group, it indicates that a priority of the transmission parameter group is relatively high, or a PUCCH resource set of the transmission parameter group can achieve relatively high reliability. Therefore, higher reliability can be achieved by transmitting the HARQ feedback information on the first PUCCH resource group.

Alternatively, optionally, the first transmission parameter group is a transmission parameter group, in the H transmission parameter groups corresponding to the H PUCCH resources, with a shortest PDSCH transmission period indicated by the transmission parameter group. In other words, a PUCCH resource group indicated by resource indication information in the transmission parameter group with the shortest PDSCH transmission period is selected as the first PUCCH resource group. The transmission parameter group with the shortest transmission period serves a service with a relatively short period, and a service with a short period has a relatively high latency requirement. Therefore, the resource group corresponding to the transmission parameter group is used as the first PUCCH resource group, so that a latency of transmitting HARQ feedback information on the resource group can be reduced.

It should be understood that the foregoing listed manners may be used in combination. A person skilled in the art may obtain a plurality of combination manners based on the foregoing listed manners. For brevity, details are not described herein again. However, these combination manners all fall within the protection scope of the embodiments of this application. For example, the first transmission parameter group is the transmission parameter group, in the H transmission parameter groups corresponding to the H PUCCH resources, with the shortest PDSCH transmission period indicated by the transmission parameter group. If PDSCH transmission periods indicated by all the transmission parameter groups are the same, the first transmission parameter group is the transmission parameter group that is in the H transmission parameter groups corresponding to the H PUCCH resources and whose active PDCCH is at the rearmost time domain location.

Step 2: Determine a second PUCCH resource set from the first PUCCH resource group.

When a quantity S of PUCCH resource sets in the first PUCCH resource group is equal to 1, the second PUCCH resource set is the PUCCH resource set indicated by the resource indication information. Each transmission parameter group corresponds to only one PUCCH resource set. After receiving a PDSCH, the terminal device may directly send, on a PUCCH resource in the PUCCH resource set, feedback information corresponding to the PDSCH. There is no need to determine one PUCCH resource set from a plurality of PUCCH resource sets. This reduces complexity of determining the resource by the terminal device.

When the quantity S of PUCCH resource sets in the first PUCCH resource group is greater than 1, one PUCCH resource set is determined from the S PUCCH resource sets as the second PUCCH resource set based on the total quantity of bits of the HARQ feedback information of the PDSCHs corresponding to the H PUCCH resources. For example, S is equal to 6. The resource indication information indicates six PUCCH resource sets. If the total quantity of bits of the HARQ feedback information is 1 to 10 bits, a first resource set in the six PUCCH resource sets is selected. If the total quantity of bits of the HARQ feedback information is 11 to 20 bits, a second resource set is selected. By analogy, if the total quantity of bits of the HARQ feedback information is 51 to 60 bits, a sixth resource set is selected. Each transmission parameter group corresponds to S PUCCH resource sets, and the S PUCCH resource sets are related to the quantity of bits of the HARQ feedback information. Therefore, after receiving a PDSCH, the terminal device selects one PUCCH resource set from a plurality of resource sets based on the quantity of bits of the HARQ feedback information in an overlapping area, to send the feedback information. It is ensured that a finally determined PUCCH resource matches the quantity of bits of the feedback information as much as possible, thereby reducing uplink resources.

Step 3: Determine a PUCCH resource from the second PUCCH resource set as the target PUCCH resource.

A PUCCH resource in the second PUCCH resource set may be indicated as the target PUCCH resource based on an indication field in a last PDCCH in the active PDCCHs of the PDSCHs corresponding to the H PUCCH resources, namely, an indication field in an active PDCCH at a rearmost time domain location. For example, the second PUCCH resource set includes four PUCCH resources, and a 2-bit indication field is included in the last active PDCCH. A value of the indication field being 0 indicates a first resource in the four PUCCH resources. Alternatively, the value of the indication field being 1 indicates a second resource.

When the second PUCCH resource set includes one PUCCH resource, the one PUCCH resource is the target PUCCH resource.

According to the method in this embodiment, the target PUCCH resource is determined based on the total quantity of bits of the HARQ feedback information of the PDSCHs corresponding to the H PUCCH resources and the indication field in the last active PDCCH.

It should be understood that the examples in FIG. 4 to FIG. 6 are provided merely for helping a person skilled in the art understand the embodiments of this application, instead of limiting the embodiments of this application to specific scenarios shown in the examples. A person skilled in the art can definitely make various equivalent modifications or changes according to the examples shown in FIG. 4 to FIG. 6, and such modifications or changes also fall within the scope of the embodiments of this application.

Fifth Possible Implementation

In the fifth possible implementation, the terminal device also sends, on one PUCCH resource, the HARQ feedback information corresponding to the K PDSCHs. A difference from the second possible implementation and the third possible implementation lies in that the terminal device needs to first select a target PUCCH resource set from a plurality of PUCCH resource sets, and then select a fourth PUCCH resource from the target PUCCH resource set to send the HARQ feedback information corresponding to the K PDSCHs.

Same as the fourth possible implementation, each of the M transmission parameter groups includes one piece of resource indication information, and the resource indication information indicates S PUCCH resource sets. S is a positive integer. In this way, the terminal device may send the HARQ feedback information of the K PDSCHs by using a plurality of PUCCH resources.

For example, the K PDSCHs correspond to R transmission parameter groups. Each of the R transmission parameter groups includes one piece of resource indication information, and the resource indication information indicates S PUCCH resource sets. R≤K, R≤M, and R is an integer greater than or equal to 2.

Correspondingly, that the first transmission resource is determined based on the first information includes: R PUCCH resource groups are determined based on resource indication information in the R transmission parameter groups. One PUCCH resource group includes S PUCCH resource sets. It should be noted that quantities of PUCCH resource sets included in the PUCCH resource groups may be the same, or may be different, or may be partially the same and partially different. Herein, an example in which each PUCCH resource group includes S PUCCH resource sets is used for description. The terminal device determines the target PUCCH resource set from a plurality of PUCCH resource sets included in the R PUCCH resource groups (the plurality of PUCCH resource sets included in the R PUCCH resource groups are a total quantity of a plurality of PUCCH resource sets corresponding to the R PUCCH resource groups; for example, if each PUCCH resource group includes S PUCCH resource sets, the total quantity is R multiplied by S), and finally select the fourth PUCCH resource from the target PUCCH resource set as the first transmission resource.

The following first describes methods for determining the target PUCCH resource set from the plurality of PUCCH resource sets included in the R PUCCH resource groups, including:

Method 1: A second PUCCH resource group is determined, where the second PUCCH resource group is S PUCCH resource sets indicated by resource indication information in a second transmission parameter group, and the second transmission parameter group is one of the R transmission parameter groups corresponding to the R PUCCH resources. Then, the terminal device determines the target PUCCH resource set from the S PUCCH resource sets indicated by the resource indication information in the second transmission parameter group.

A manner of determining the second transmission parameter group from the R transmission parameter groups is the same as the method of "determining the first transmission parameter group from the H transmission parameter groups" in step 1 in the fourth implementation. For brevity, details are not described herein again.

A method for determining the target PUCCH resource set from the S PUCCH resource sets indicated by the resource indication information in the second transmission parameter group is similar to the method for "determining the second PUCCH resource set from the first PUCCH resource group" in step 2 in the fourth possible implementation. A brief description is provided herein. When S is equal to 1, the target PUCCH resource set is the PUCCH resource set indicated by the resource indication information. When S is greater than 1, one PUCCH resource set needs to be determined from the S PUCCH resource sets as the target PUCCH resource set based on the total quantity of bits of the HARQ feedback information of the K PDSCHs. For details of "determining a PUCCH resource set from the S PUCCH resource sets as the target PUCCH resource set", refer to the description in step 2 in the fourth possible implementation. For brevity, details are not described herein again.

Method 2: W PUCCH resource sets are determined, based on the total quantity of bits of the HARQ feedback information of the K PDSCHs, from the plurality of PUCCH resource sets included in the R PUCCH resource groups, where W is an integer greater than or equal to 1. Then, the target PUCCH resource set is determined from the W PUCCH resource sets.

Herein, for a specific method in which "W PUCCH resource sets are determined, based on the total quantity of bits of the HARQ feedback information of the K PDSCHs, from the plurality of PUCCH resource sets included in the R PUCCH resource groups", refer to the method in which "the second PUCCH resource set is determined from the first PUCCH resource group" in step 2 in the fourth possible implementation, where these two methods are similar. The W PUCCH resource sets need to be determined, based on the total quantity of bits of the HARQ feedback information of the K PDSCHs, from the plurality of PUCCH resource sets included in the R PUCCH resource groups as target PUCCH resource sets.

When W is equal to 1, the determined PUCCH resource set is denoted as the target PUCCH resource set.

There may be a plurality of PUCCH resource sets that meet a condition in the plurality of PUCCH resource sets included in the R PUCCH resource groups, that is, W may be greater than 1. In this case, one PUCCH resource set needs to be determined from the W PUCCH resource sets as the target PUCCH resource set. The W PUCCH resource sets correspond to W transmission parameter groups, and a target transmission parameter group may be determined from the W transmission parameter groups. Resource indication information in the target transmission parameter group indicates the target PUCCH resource set. Herein, for a method for "determining the target transmission parameter group from the W transmission parameter groups", refer to the method for "determining the first transmission parameter group from the H transmission parameter groups" in step 1 in the fourth possible implementation. For brevity, details are not described again.

After the target PUCCH resource set is determined by using Method 1 or Method 2, the fourth PUCCH resource is selected from the target PUCCH resource set as the first transmission resource. Herein, for a specific method for "selecting the fourth PUCCH resource from the target PUCCH resource set as the first transmission resource", refer to the description of "determining a PUCCH resource from the second PUCCH resource set as the target PUCCH resource" in step 3 in the fourth possible implementation. For brevity, details are not described again.

In the fifth possible implementation, the terminal device sends, on one PUCCH resource, the HARQ feedback information corresponding to the K PDSCHs. Herein, for the HARQ feedback information that corresponds to the K PDSCHs and that is sent on one PUCCH resource, a sending format of the HARQ feedback information may be predefined, for example, the quantity of bits of the HARQ feedback information corresponding to the K PDSCHs and an arrangement sequence of the bits. Herein, for the arrangement sequence of the bits and a manner of determining the quantity of bits of the HARQ feedback information corresponding to the K PDSCHs, refer to the description in the second possible implementation or the third possible implementation. For brevity, details are not described again.

The foregoing describes in detail the method for transmitting HARQ feedback information according to the embodiments of this application with reference to FIG. 1 to FIG. 7. The following describes an apparatus for transmitting HARQ feedback information according to the embodiments of this application with reference to FIG. 8 to FIG. 11. It should be understood that the technical features described in the method embodiments are also applicable to the following apparatus embodiments.

Figure 8:
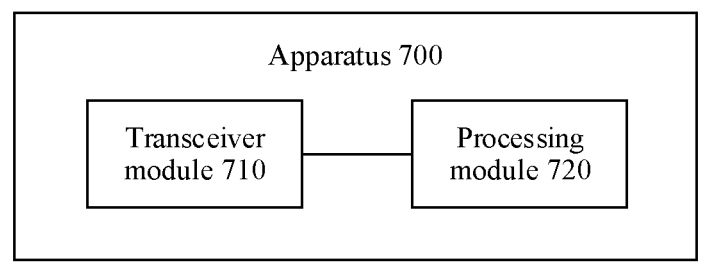
FIG. 8 is a schematic block diagram of an apparatus for transmitting HARQ feedback information according to an embodiment of this application.

FIG. 8 is a schematic block diagram of an apparatus 700 for transmitting HARQ feedback information according to an embodiment of this application. The apparatus 700 is configured to perform the method performed by the terminal device in the foregoing method embodiments. Optionally, a specific form of the apparatus 700 may be a terminal device or a module (for example, a chip) in the terminal device. This is not limited in this embodiment of this application. The apparatus 700 includes a transceiver module 710 and a processing module 720.

The transceiver module 710 is configured to obtain first information. The first information includes M transmission parameter groups, and M is an integer greater than or equal to 2.

The transceiver module 710 is further configured to receive K downlink data channels. K is an integer greater than or equal to 2. Each of the K downlink data channels corresponds to one of the M transmission parameter groups. A first downlink data channel corresponds to a first transmission parameter group, and a second downlink data channel corresponds to a second transmission parameter group. The first downlink data channel and the second downlink data channel are different downlink data channels in the K downlink data channels. The first transmission parameter group and the second transmission parameter group are different transmission parameter groups in the M transmission parameter groups.

The processing module 720 is configured to determine a first transmission resource based on the first information.

The transceiver module 710 is further configured to send, on the first transmission resource, HARQ feedback information corresponding to the K downlink data channels.

In a possible implementation, the K downlink data channels correspond to R transmission parameter groups. Each of the R transmission parameter groups includes one piece of resource indication information, and the resource indication information indicates one uplink control channel resource. R≤K, R≤M, and R is an integer greater than or equal to 2. Correspondingly, that the first transmission resource is determined based on the first information includes: The first transmission resource is determined based on resource indication information in the R transmission parameter groups.

Optionally, the first transmission resource is R uplink control channel resources indicated by the resource indication information in the R transmission parameter groups.

Optionally, that the transceiver module 710 is configured to send, on the first transmission resource, HARQ feedback information corresponding to the K downlink data channels includes: If H uplink control channel resources in R uplink control channel resources indicated by the resource indication information in the R transmission parameter groups overlap in time domain, the transceiver module 710 sends, on a target uplink control channel resource, HARQ feedback information of downlink data channels corresponding to the H uplink control channel resources. H≤R, and H is an integer greater than or equal to 2. The target uplink control channel resource is a part or all of the first transmission resource.

Optionally, the target uplink control channel resource is an uplink control channel resource, at a foremost start location in time domain in the H uplink control channel resources. Alternatively, the target uplink control channel resource is an uplink control channel resource, in the H uplink control channel resources, that meets a feedback latency required for sending the HARQ feedback information of the downlink data channels corresponding to the H uplink control channel resources and that is at the foremost start location in time domain. Alternatively, the target uplink control channel resource is an uplink control channel resource with a highest priority in the H uplink control channel resources.

Optionally, the transceiver module 710 is further configured to: receive second information, where the second information includes G pieces of resource indication information, each of the G pieces of resource indication information indicates one uplink control channel resource, and G is an integer greater than or equal to 2; and determine, as the target uplink control channel resource based on a total quantity of bits of the HARQ feedback information of the downlink data channels corresponding to the H uplink control channel resources, one uplink control channel resource from G uplink control channel resources indicated by the G pieces of resource indication information.

Optionally, that the transceiver module 710 is configured to send, on the first transmission resource, HARQ feedback information corresponding to the K downlink data channels includes: If H uplink control channel resources in R uplink control channel resources indicated by the resource indication information in the R transmission parameter groups overlap in time domain, the transceiver module 710 sends, on a first uplink control channel resource, HARQ feedback information of a downlink data channel corresponding to the first uplink control channel resource, and cancels sending of HARQ feedback information of a downlink data channel corresponding to a second uplink control channel resource. The first uplink control channel resource and the second uplink control channel resource are different uplink control channel resources in the H uplink control channel resources. The first uplink control channel resource is a part or all of the first transmission resource.

Optionally, a priority of the first uplink control channel resource is higher than a priority of the second uplink control channel resource. Alternatively, a transmission period of the downlink data channel corresponding to the first uplink control channel resource is shorter than a transmission period of the downlink data channel corresponding to the second uplink control channel resource. Alternatively, an identifier of a transmission parameter group corresponding to the first uplink control channel resource is less than an identifier of a transmission parameter group corresponding to the second uplink control channel resource.

In another possible implementation, the first information further includes first resource indication information, and the first resource indication information is used to indicate the first transmission resource.

In still another possible implementation, the first information further includes N pieces of resource indication information. Each of the N pieces of resource indication information indicates one uplink control channel resource, and N is an integer greater than 1. Correspondingly, that the first transmission resource is determined based on the first information includes: One uplink control channel resource is determined, from N uplink control channel resources indicated by the N pieces of resource indication information, as the first transmission resource based on a total quantity of bits of the feedback information corresponding to the K downlink data channels.

Optionally, that the transceiver module 710 is configured to send, on the first transmission resource, HARQ feedback information corresponding to the K downlink data channels includes:

The transceiver module 710 sends, on the first transmission resource, only the HARQ feedback information of the K downlink data channels; or sends, on the first transmission resource, HARQ feedback information of all active downlink data channels, where all the active downlink data channels include the K downlink data channels; or sends, on the first transmission resource, HARQ feedback information of downlink data channels corresponding to the M transmission parameter groups, where the downlink data channels corresponding to the M transmission parameter groups include the K downlink data channels.

Optionally, the HARQ feedback information sent on the first transmission resource is arranged in the following sequence: first HARQ feedback information is before second HARQ feedback information. The first HARQ feedback information and the second HARQ feedback information meet the following condition: A priority of a downlink data channel corresponding to the first HARQ feedback information is higher than a priority of a downlink data channel corresponding to the second HARQ feedback information; or the priority of the downlink data channel corresponding to the first HARQ feedback information is the same as the priority of the downlink data channel corresponding to the second HARQ feedback information, and a start location, in time domain, of the downlink data channel corresponding to the first HARQ feedback information is earlier than a start location, in time domain, of the downlink data channel corresponding to the second HARQ feedback information. The first HARQ feedback information and the second HARQ feedback information are two different pieces of HARQ feedback information in the HARQ feedback information sent on the first transmission resource.

Optionally, each of the M transmission parameter groups includes one or more pieces of the following information: a transmission period of a downlink data channel, an identifier of the transmission parameter group, and a modulation and coding scheme MCS table used for downlink data channel transmission.

It should be understood that the apparatus 700 for transmitting HARQ feedback information according to this embodiment of this application may correspondingly execute the methods of the terminal device in the foregoing method embodiments, for example, the method in FIG. 3. In addition, the foregoing and other management operations and/or functions of the modules in the apparatus 700 are respectively used to implement corresponding steps of the methods of the terminal device in the foregoing method embodiments. Therefore, beneficial effects in the foregoing method embodiments may also be implemented. For brevity, details are not described herein.

It should further be understood that the modules in the apparatus 700 may be implemented in a form of software and/or hardware. This is not specifically limited. In other words, the apparatus 700 is presented in a form of functional modules. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 700 may be in a form shown in FIG. 9. The processing module 720 may be implemented by using a processor 801 shown in FIG. 9. The transceiver module 710 may be implemented by using a transceiver 803 shown in FIG. 9. The processor is implemented by executing a computer program stored in the memory. Optionally, when the apparatus 700 is a chip, a function and/or an implementation process of the transceiver module 710 may alternatively be implemented by a pin, a circuit, or the like. Optionally, the memory is a storage unit in the chip, for example, a register or a cache. The storage unit may alternatively be a storage unit, such as a memory 802 shown in FIG. 9, that is in the terminal device and that is located outside the chip.

Figure 9:
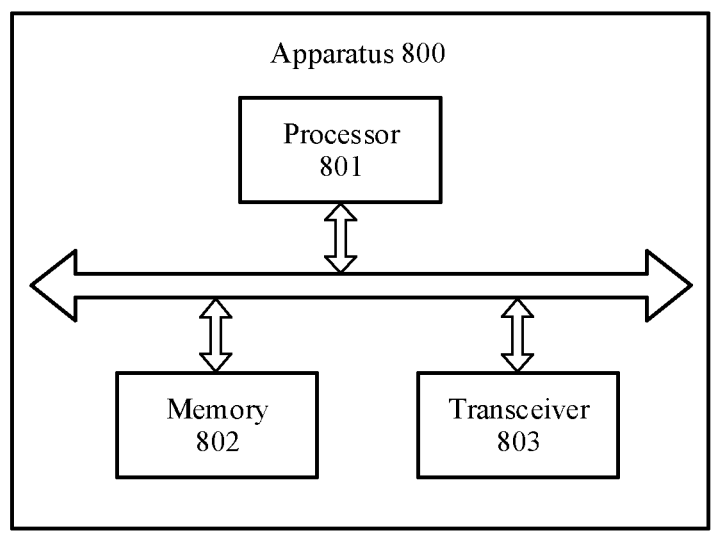
FIG. 9 is a schematic structural diagram of an apparatus for transmitting HARQ feedback information according to an embodiment of this application.

FIG. 9 is a schematic structural diagram of an apparatus 800 for transmitting HARQ feedback information according to an embodiment of this application. As shown in FIG. 9, the apparatus 800 includes the processor 801.

In a possible implementation, the processor 801 is configured to invoke an interface to perform the following actions: obtaining first information, where the first information includes M transmission parameter groups, and M is an integer greater than or equal to 2; and receiving K downlink data channels, where K is an integer greater than or equal to 2. Each of the K downlink data channels corresponds to one of the M transmission parameter groups. A first downlink data channel corresponds to a first transmission parameter group, and a second downlink data channel corresponds to a second transmission parameter group. The first downlink data channel and the second downlink data channel are different downlink data channels in the K downlink data channels. The first transmission parameter group and the second transmission parameter group are different transmission parameter groups in the M transmission parameter groups. The processor 801 is configured to determine a first transmission resource based on the first information. The processor 801 is further configured to invoke the interface to send, on the first transmission resource, HARQ feedback information corresponding to the K downlink data channels.

It should be understood that the processor 801 may invoke the interface to perform the foregoing receiving and sending actions. The invoked interface may be a logical interface or a physical interface. This is not limited. Optionally, the physical interface may be implemented by using a transceiver. Optionally, the apparatus 800 further includes the transceiver 803.

Optionally, the apparatus 800 further includes the memory 802, and the memory 802 may store program code in the foregoing method embodiments, so that the processor 801 invokes the program code.

If the apparatus 800 includes the processor 801, the memory 802, and the transceiver 803, the processor 801, the memory 802, and the transceiver 803 communicate with each other through an inner connection path, to transmit a control signal and/or a data signal. In a possible design, the processor 801, the memory 802, and the transceiver 803 may be implemented by using a chip. The processor 801, the memory 802, and the transceiver 803 may be implemented in a same chip, or may be separately implemented in different chips, or functions of any two of the processor 801, the memory 802, and the transceiver 803 are implemented in one chip. The memory 802 may store the program code, and the processor 801 invokes the program code stored in the memory 802, to implement a corresponding function of the apparatus 800.

It should be understood that the apparatus 800 may further be configured to perform other steps and/or operations on a terminal device side in the foregoing embodiments. For brevity, details are not described herein.

Figure 10:
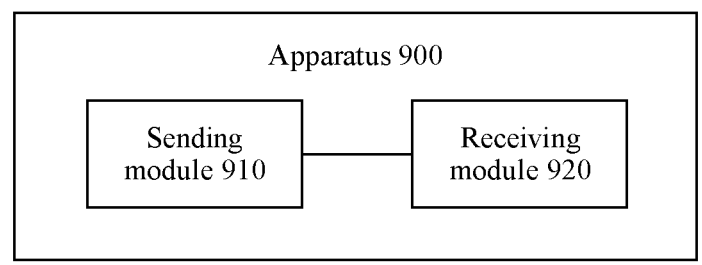
FIG. 10 is a schematic block diagram of an apparatus for transmitting HARQ feedback information according to another embodiment of this application.

FIG. 10 is a schematic block diagram of an apparatus 900 for transmitting HARQ feedback information according to an embodiment of this application. The apparatus 900 is configured to perform the method performed by the network device in the foregoing method embodiments. Optionally, a specific form of the apparatus 900 may be a network device or a chip in the network device. This is not limited in this embodiment of this application. The apparatus 900 includes a sending module 910 and a receiving module 920.

The sending module 910 is configured to send first information. The first information includes M transmission parameter groups, and M is an integer greater than or equal to 2.

The sending module 910 is further configured to send K downlink data channels based on the first information. K is an integer greater than or equal to 2. Each of the K downlink data channels corresponds to one of the M transmission parameter groups. A first downlink data channel corresponds to a first transmission parameter group, and a second downlink data channel corresponds to a second transmission parameter group. The first downlink data channel and the second downlink data channel are different downlink data channels in the K downlink data channels. The first transmission parameter group and the second transmission parameter group are different transmission parameter groups in the M transmission parameter groups.

The receiving module 920 is configured to receive, on a first transmission resource, HARQ feedback information corresponding to the K downlink data channels.

Optionally, the HARQ feedback information corresponding to the K downlink data channels is located in one slot.

In a possible implementation, the K downlink data channels correspond to R transmission parameter groups. Each of the R transmission parameter groups includes one piece of resource indication information, and the resource indication information indicates one uplink control channel resource. R≤K, R≤M, and R is an integer greater than or equal to 2.

Optionally, the first transmission resource is R uplink control channel resources indicated by resource indication information in the R transmission parameter groups.

Optionally, that the HARQ feedback information of the K downlink data channels is received on the first transmission resource includes: If H uplink control channel resources in R uplink control channel resources indicated by resource indication information in the R transmission parameter groups overlap in time domain, HARQ feedback information of downlink data channels corresponding to the H uplink control channel resources is received on a target uplink control channel resource. H≤R, and H is an integer greater than or equal to 2. The target uplink control channel resource is a part or all of the first transmission resource.

Optionally, the target uplink control channel resource is an uplink control channel resource, at a foremost start location in time domain, in the H uplink control channel resources. Alternatively, the target uplink control channel resource is an uplink control channel resource that is in the H uplink control channel resources and that meets a latency requirement required for sending the feedback information. Alternatively, the target uplink control channel resource is an uplink control channel resource with a highest priority in the H uplink control channel resources.

Optionally, the sending module 910 is further configured to: send second information, where the second information includes G pieces of resource indication information, each of the G pieces of resource indication information indicates one uplink control channel resource, and G is an integer greater than or equal to 2; and determine, as the target uplink control channel resource based on a total quantity of bits of the HARQ feedback information of the downlink data channels corresponding to the H uplink control channel resources, one uplink control channel resource from G uplink control channel resources indicated by the G pieces of resource indication information.

Optionally, that the receiving module 920 is configured to receive, on a first transmission resource, HARQ feedback information of the K downlink data channels includes: If H uplink control channel resources in R uplink control channel resources indicated by resource indication information in the R transmission parameter groups overlap in time domain, the receiving module 920 receives, on a first uplink control channel resource, HARQ feedback information of a downlink data channel corresponding to the first uplink control channel resource; and skips receiving, on a second uplink control channel resource, HARQ feedback information of a downlink data channel corresponding to the second uplink control channel resource. The first uplink control channel resource and the second uplink control channel resource are different uplink control channel resources in the H uplink control channel resources. The first uplink control channel resource is a part or all of the first transmission resource.

Optionally, a priority of the first uplink control channel resource is higher than a priority of the second uplink control channel resource. Alternatively, a transmission period of the downlink data channel corresponding to the first uplink control channel resource is shorter than a transmission period of the downlink data channel corresponding to the second uplink control channel resource. Alternatively, an identifier of a transmission parameter group corresponding to the first uplink control channel resource is less than an identifier of a transmission parameter group corresponding to the second uplink control channel resource.

In another possible implementation, the first information further includes first resource indication information. The first resource indication information is used to indicate a first uplink control channel resource, and the first uplink control channel resource is the first transmission resource.

In still another possible implementation, the first information further includes N pieces of resource indication information. Each of the N pieces of resource indication information indicates one uplink control channel resource, and N is an integer greater than 1. The method further includes: determining, as the first transmission resource based on a total quantity of bits of the HARQ feedback information corresponding to the K downlink data channels, one uplink control channel resource from N uplink control channel resources indicated by the N pieces of resource indication information.

Optionally, that the receiving module 920 is configured to receive, on a first transmission resource, HARQ feedback information corresponding to the K downlink data channels includes: The receiving module 920 receives, on the first transmission resource, the HARQ feedback information of the K downlink data channels; or receives, on the first transmission resource, HARQ feedback information of all active downlink data channels, where all the active downlink data channels include the K downlink data channels; or receives, on the first transmission resource, HARQ feedback information of downlink data channels corresponding to the M transmission parameter groups, where the downlink data channels corresponding to the M transmission parameter groups include the K downlink data channels.

Optionally, the HARQ feedback information received on the first transmission resource is arranged in the following sequence: first HARQ feedback information is before second HARQ feedback information. The first HARQ feedback information and the second HARQ feedback information meet the following condition: A priority of a downlink data channel corresponding to the first HARQ feedback information is higher than a priority of a downlink data channel corresponding to the second HARQ feedback information; or the priority of the downlink data channel corresponding to the first HARQ feedback information is the same as the priority of the downlink data channel corresponding to the second HARQ feedback information, and a start location, in time domain, of the downlink data channel corresponding to the first HARQ feedback information is earlier than a start location, in time domain, of the downlink data channel corresponding to the second HARQ feedback information. The first HARQ feedback information and the second HARQ feedback information are two different pieces of HARQ feedback information in the HARQ feedback information sent on the first transmission resource.

Optionally, each of the M transmission parameter groups includes one or more pieces of the following information: a transmission period of a downlink data channel, an identifier of the transmission parameter group, and a modulation and coding scheme MCS table used for downlink data channel transmission.

It should be understood that the apparatus 900 for transmitting HARQ feedback information according to this embodiment of this application may correspondingly execute the methods of the network device in the foregoing method embodiments, for example, the method in FIG. 3. In addition, the foregoing and other management operations and/or functions of the modules in the apparatus 900 are respectively used to implement corresponding steps of the methods of the network device in the foregoing method embodiments. Therefore, beneficial effects in the foregoing method embodiments may also be implemented. For brevity, details are not described herein.

It should further be understood that the modules in the apparatus 900 may be implemented in a form of software and/or hardware. This is not limited. In other words, the apparatus 900 is presented in a form of functional modules. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 900 may be in a form shown in FIG. 11. The sending module 910 and the receiving module 920 may be implemented by using a transceiver 1003 shown in FIG. 11. The processor is implemented by executing a computer program stored in the memory. Optionally, when the apparatus 900 is a chip, functions and/or implementation processes of the sending module 910 and the receiving module 920 may alternatively be implemented by a pin, a circuit, or the like. Optionally, the memory is a storage unit in the chip, for example, a register or a cache. The storage unit may alternatively be a storage unit, such as a memory 1002 shown in FIG. 11, that is in the network device and that is located outside the chip.

Figure 11:
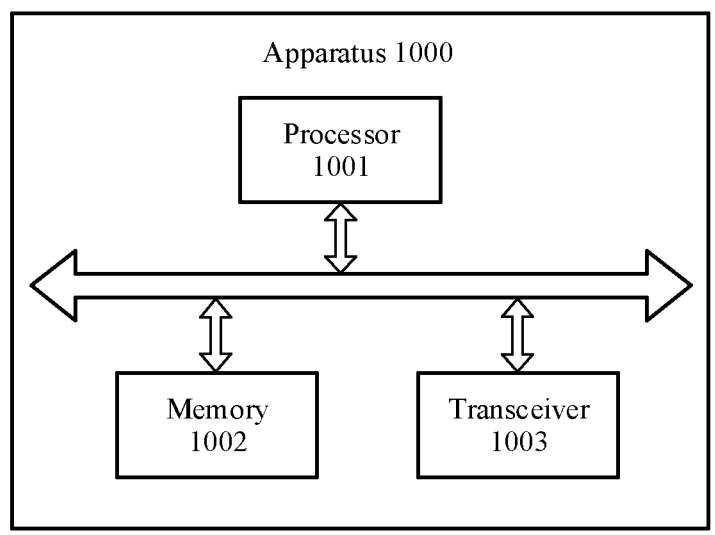
FIG. 11 is a schematic structural diagram of an apparatus for transmitting HARQ feedback information according to another embodiment of this application.

FIG. 11 is a schematic structural diagram of an apparatus 1000 for transmitting HARQ feedback information according to an embodiment of this application. As shown in FIG. 11, the apparatus 1000 includes a processor 1001.

In a possible implementation, the processor 1001 is configured to invoke an interface to perform the following actions: sending first information, where the first information includes M transmission parameter groups, and M is an integer greater than or equal to 2; sending K downlink data channels based on the first information, where K is an integer greater than or equal to 2, each of the K downlink data channels corresponds to one of the M transmission parameter groups, a first downlink data channel corresponds to a first transmission parameter group, a second downlink data channel corresponds to a second transmission parameter group, the first downlink data channel and the second downlink data channel are different downlink data channels in the K downlink data channels, and the first transmission parameter group and the second transmission parameter group are different transmission parameter groups in the M transmission parameter groups; and receiving, on the first transmission resource, HARQ feedback information corresponding to the K downlink data channels.

It should be understood that the processor 1001 may invoke the interface to perform the foregoing receiving and sending actions. The invoked interface may be a logical interface or a physical interface. This is not limited. Optionally, the physical interface may be implemented by using a transceiver. Optionally, the apparatus 1000 further includes the transceiver 1003.

Optionally, the apparatus 1000 further includes the memory 1002, and the memory 1002 may store program code in the foregoing method embodiments, so that the processor 1001 invokes the program code.

If the apparatus 1000 includes the processor 1001, the memory 1002, and the transceiver 1003, the processor 1001, the memory 1002, and the transceiver 1003 communicate with each other through an inner connection path, to transmit a control signal and/or a data signal.

In a possible design, the processor 1001, the memory 1002, and the transceiver 1003 may be implemented by using a chip. The processor 1001, the memory 1002, and the transceiver 1003 may be implemented in a same chip, or may be separately implemented in different chips, or functions of any two of the processor 801, the memory 802, and the transceiver 803 are implemented in one chip. The memory 1002 may store the program code, and the processor 1001 invokes the program code stored in the memory 1002, to implement a corresponding function of the apparatus 1000.

It should be understood that the apparatus 1000 may further be configured to perform other steps and/or operations on a network device side in the foregoing embodiments. For brevity, details are not described herein.

In the embodiments of this application, unless otherwise stated or there is a logical conflict, terms and/or descriptions between different embodiments are consistent and may be mutually referenced, and technical features in different embodiments may be combined according to an internal logical relationship thereof, to form a new embodiment.

The methods disclosed in the foregoing embodiments of this application may be applied to a processor or may be implemented by the processor. The processor may be an integrated circuit chip and has a signal processing capability. In an implementation process, steps in the foregoing method embodiments can be implemented by using a hardware integrated logical circuit in the processor, or by using an instruction in a form of software. The processor may be a general-purpose processor, a digital signal processor (DSP), an application-specific integrated circuit (ASIC), a field programmable gate array (FPGA) or another programmable logic device, a discrete gate, a transistor logic device, a discrete hardware component, a system on chip (SoC), a central processing unit (CPU), a network processor (NP), a digital signal processor (DSP), a micro controller unit (MCU), a programmable logic device (PLD), or another integrated chip. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and completed by a hardware decoding processor, or may be executed and completed by a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. According to description that is used as an example instead of a limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that memories in the system and method described in this specification include but are not limited to the memories and memories of any other proper types.

It should be understood that in the embodiments of this application, numbers "first", "second", and the like introduced for the terms are merely used to distinguish between different objects, for example, to distinguish between different information or different transmission parameter groups, and do not constitute a limitation on the scope of the embodiments of this application. The embodiments of this application are not limited thereto.

It should further be understood that sequence numbers of the foregoing processes do not mean execution sequences in various embodiments of this application. The execution sequences of the processes should be determined based on functions and internal logic of the processes. Numbers or sequence numbers in the foregoing processes are merely used for differentiation for ease of description, and should not constitute any limitation on an implementation process of the embodiments of this application.

It should further be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. The foregoing uses three elements A, B, and C as an example to describe an optional case of the item. When an expression is "the item includes at least one of the following: A, B, . . . , and X", in other words, more elements are included in the expression, a case to which the item is applicable may also be obtained according to the foregoing rule.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method performed by an apparatus, comprising:
   obtaining a first information comprising at least two transmission parameter groups, wherein each of the at least two transmission parameter groups comprises one or more pieces of the following information: a transmission period of a downlink data channel, an identifier of the transmission parameter group, or a modulation and coding scheme (MCS) table used for downlink data channel transmission;

receiving at least two downlink data channels, wherein each of the downlink data channels corresponds to one of the transmission parameter groups;

determining a first transmission resource based on the first information; and sending, on the first transmission resource, hybrid automatic repeat request (HARQ) feedback information corresponding to the downlink data channels.

2. The method according to claim 1, wherein the first information further comprises N pieces of resource indication information, each of the N pieces of resource indication information indicates one uplink control channel resource, and N is an integer greater than 1; and the determining a first transmission resource based on the first information further comprises determining, as the first transmission resource based on a total quantity of bits of the feedback information corresponding to the downlink data channels, one uplink control channel resource from N uplink control channel resources indicated by the N pieces of resource indication information.

3. The method according to claim 2, wherein the sending HARQ feedback information further comprises:

sending, a first transmission on the first transmission source, wherein the first transmission is selected from the group of sending only the HARQ feedback information of the downlink data channels, sending HARQ feedback information of all active downlink data channels, wherein all the active downlink data channels comprise the downlink data channels, or sending HARQ feedback information of downlink data channels corresponding to the M transmission parameter groups, wherein the downlink data channels corresponding to the M transmission parameter groups comprise the K downlink data channels.

4. The method according to claim 2, wherein the HARQ feedback information sent on the first transmission resource comprises first HARQ feedback information and second HARQ feedback information, and the HARQ feedback information sent on the first transmission resource is arranged in the following sequence:

the first HARQ feedback information is before the second HARQ feedback information; and an identifier of a transmission parameter group of a physical downlink shared channel (PDSCH) corresponding to the first HARQ feedback information is less than an identifier of a transmission parameter group of a PDSCH corresponding to the second HARQ feedback information; or the identifier of the transmission parameter group of the PDSCH corresponding to the first HARQ feedback information is the same as the identifier of the transmission parameter group of the PDSCH corresponding to the second HARQ feedback information, and a start location, in time domain, of the PDSCH corresponding to the first HARQ feedback information is earlier than a start location, in time domain, of the PDSCH corresponding to the second HARQ feedback information.

5. The method according to claim 1, wherein the HARQ feedback information corresponding to the K downlink data channels is located in one slot.

6. An apparatus comprising:
one or more processors; and
a non-transitory computer readable medium storing instructions that, when executed by the one or more processors, cause the apparatus to:

obtain first information, wherein the first information comprises at least two transmission parameter groups, each of the transmission parameter groups comprises one or more pieces of the following information: a transmission period of a downlink data channel, an identifier of the transmission parameter group, or a modulation and coding scheme (MCS) table used for downlink data channel transmission;

receive at least two downlink data channels, wherein each of the downlink data channels corresponds to one of the transmission parameter groups, a first downlink data channel corresponds to a first transmission parameter group, a second downlink data channel corresponds to a second transmission parameter group, the first downlink data channel and the second downlink data channel are different downlink data channels in the at least downlink data channels, and the first transmission parameter group and the second transmission parameter group are different transmission parameter groups in the at least two transmission parameter groups;

determine a first transmission resource based on the first information; and send, on the first transmission resource, hybrid automatic repeat request (HARQ) feedback information corresponding to the K downlink data channels.

7. The apparatus according to claim 6, wherein the first information further comprises N pieces of resource indication information, each of the N pieces of resource indication information indicates one uplink control channel resource, and N is an integer greater than 1; and the instructions further cause the apparatus to:

determine, as the first transmission resource based on a total quantity of bits of the feedback information corresponding to the downlink data channels, one uplink control channel resource from N uplink control channel resources indicated by the N pieces of resource indication information.

8. The apparatus according to claim 7, wherein the instructions further cause the apparatus to send a transmission on a first transmission resource, wherein the transmission is selected from one of the following: only the HARQ feedback information of the downlink data channels, HARQ feedback information of all active downlink data channels, wherein all the active downlink data channels comprise the downlink data channels, or HARQ feedback information of downlink data channels corresponding to the transmission parameter groups, wherein the downlink data channels corresponding to the transmission parameter groups comprise the downlink data channels.

9. The apparatus according to claim 7, wherein the HARQ feedback information sent on the first transmission resource comprises first HARQ feedback information and second HARQ feedback information, and the HARQ feedback information sent on the first transmission resource is arranged in the following sequence:

the first HARQ feedback information is before the second HARQ feedback information; and an identifier of a transmission parameter group of a physical downlink shared channel (PDSCH) corresponding to the first HARQ feedback information is less than an identifier of a transmission parameter group of a PDSCH corresponding to the second HARQ feedback information; or the identifier of the transmission parameter group of the PDSCH corresponding to the first HARQ feedback information is the same as the identifier of the transmission parameter group of the PDSCH corresponding to the second HARQ feedback information, and a start location, in time domain, of the PDSCH corresponding to the first HARQ feedback information is earlier than a start location, in time domain, of the PDSCH corresponding to the second HARQ feedback information.

10. The apparatus according to claim 6, wherein the HARQ feedback information corresponding to the K downlink data channels is located in one slot.

11. An apparatus comprising:
one or more processors; and
a non-transitory computer readable medium storing instructions that, when executed by the one or more processors, cause the apparatus to:
send first information, wherein the first information comprises at least two transmission parameter groups, each of the transmission parameter groups comprises one or more pieces of the following information: a transmission period of a downlink data channel, an identifier of the transmission parameter group, or a modulation and coding scheme (MCS) table used for downlink data channel transmission;
send at least two downlink data channels based on the first information, each of the downlink data channels corresponds to one of the transmission parameter groups, a first downlink data channel corresponds to a first transmission parameter group, a second downlink data channel corresponds to a second transmission parameter group, the first downlink data channel and the second downlink data channel are different downlink data channels in the downlink data channels, and the first transmission parameter group and the second transmission parameter group are different transmission parameter groups in the transmission parameter groups; and
receive, on a first transmission resource, HARQ feedback information corresponding to the downlink data channels.

12. The apparatus according to claim 11, wherein the first information further comprises N pieces of resource indication information, each of the N pieces of resource indication information indicates one uplink control channel resource, N is an integer greater than 1, and the instructions further cause the apparatus to:
determine, as the first transmission resource based on a total quantity of bits of the HARQ feedback information corresponding to the K downlink data channels, one uplink control channel resource from N uplink control channel resources indicated by the N pieces of resource indication information.

13. The apparatus according to claim 12, wherein the instructions further cause the apparatus to:
receive, on the first transmission resource, the HARQ feedback information of the downlink data channels; or
receive, on the first transmission resource, HARQ feedback information of all active downlink data channels, wherein all the active downlink data channels comprise the downlink data channels; or
receive, on the first transmission resource, HARQ feedback information of downlink data channels corresponding to the transmission parameter groups, wherein the downlink data channels corresponding to the transmission parameter groups comprise the downlink data channels.

14. The apparatus according to claim 12, wherein the HARQ feedback information received on the first transmission resource comprises first HARQ feedback information and second HARQ feedback information, and the HARQ feedback information received on the first transmission resource is arranged in the following sequence:
the first HARQ feedback information is before the second HARQ feedback information; and
an identifier of a transmission parameter group of a physical downlink shared channel, PDSCH, corresponding to the first HARQ feedback information is less than an identifier of a transmission parameter group of a PDSCH corresponding to the second HARQ feedback information; or the identifier of the transmission parameter group of the PDSCH corresponding to the first HARQ feedback information is the same as the identifier of the transmission parameter group of the PDSCH corresponding to the second HARQ feedback information, and a start location, in time domain, of the PDSCH corresponding to the first HARQ feedback information is earlier than a start location, in time domain, of the PDSCH corresponding to the second HARQ feedback information.

15. The apparatus according to claim 11, wherein the HARQ feedback information corresponding to the K downlink data channels is located in one slot.

* * * * *